US006551744B1

(12) United States Patent
Ohzuku et al.

(10) Patent No.: US 6,551,744 B1
(45) Date of Patent: Apr. 22, 2003

(54) POSITIVE ELECTRODE ACTIVE MATERIAL AND NON-AQUEOUS ELECTROLYTE SECONDARY BATTERY CONTAINING THE SAME

(75) Inventors: Tsutomu Ohzuku, Nara (JP); Hiroshi Yoshizawa, Hirakata (JP); Masatoshi Nagayama, Hirakata (JP)

(73) Assignees: Matsushita Electric Industrial Co., Ltd., Osaka (JP); Osaka City Government, Osaka (JP); Tanaka Chemical Corporation, Fukui (JP)

( * ) Notice: Subject to any disclaimer, the term of this patent is extended or adjusted under 35 U.S.C. 154(b) by 0 days.

(21) Appl. No.: 09/723,777

(22) Filed: Nov. 28, 2000

(30) Foreign Application Priority Data

Jul. 27, 2000 (JP) ........................................ 2000-227858

(51) Int. Cl.$^7$ ............................................. H01M 10/24
(52) U.S. Cl. .................................... 429/223; 429/218.1
(58) Field of Search ......................... 429/218.1, 231.95, 429/223, 224

(56) References Cited

U.S. PATENT DOCUMENTS

| | | | |
|---|---|---|---|
| 5,264,201 A | | 11/1993 | Dahn et al. |
| 5,370,948 A | | 12/1994 | Hasegawa et al. |
| 5,393,622 A | | 2/1995 | Nitta et al. |
| 5,626,635 A | * | 5/1997 | Yamaura et al. ............ 29/623.5 |
| 5,629,110 A | | 5/1997 | Kobayashi et al. |
| 5,985,237 A | | 11/1999 | Lu et al. |
| 6,045,771 A | * | 4/2000 | Matsubara et al. ......... 423/593 |

FOREIGN PATENT DOCUMENTS

| | | |
|---|---|---|
| JP | 08171910 A | 7/1996 |
| JP | 09129230 A | 5/1997 |
| JP | 10069910 A | 3/1998 |

OTHER PUBLICATIONS

Ohzuku, et al., "Electrochemistry and Structural Chemistry of LiNiO$_2$ (R3m) for 4 Volt Secondary Lithium Cells," *J. Electrochem. Soc.*, 140:7, pp. 1862–1870 (Jul. 1993).
Ueda, et al., "Solid–State Reactions of LiNi$_{1/2}$Co$_{1/2}$O$_2$ (R3m) for 4 Volt Secondary Lithium Cells," *J. Electrochem. Soc.*, 141:8, pp. 2010–2014, (Aug. 1994).
Ohzuku, et al., "Comparative Study of LiCoO$_2$, LiNi$_{1/2}$Co$_{1/2}$O$_2$ And LiNiO$_2$ For 4 Volt Secondary Lithium Cells," *Electrochimica Acta*, 38:9, pp. 1159–1167, (1993).
Ohzuku, et al., "Synthesis and Characterization of LiAl$_{1/4}$Ni$_{3/4}$O$_2$ (R3m) for Lithium–Ion (Shuttlecock) Batteries," *J. Electrochem. Soc.*, 142:12, pp. 4033–4039, (Dec. 1995).
Ohzuku, et al., "Solid State Electrochemistry of Intercalation Compound of LiAl$_{1/2}$Ni$_{1/2}$O$_2$ (R3m) for Lithium–Ion Batteries," *Denki Kagaku*, 66:12, pp. 1209–1214, (1998).
Ohzuku, et al., "New Route to Prepare LiNiO$_2$ For 4–Volts Secondary Lithium Cells," *Chemistry Express*, 7:9, pp. 689–692, (1992).
Ohzuku, et al., "Synthesis and Characterization of LiNiO$_2$ (R3m) for Rechargeable Nonaqueous Cells," *Chemistry Express*, 6:3, pp. 161–164, (1991).
Ohzuku, et al., "Why Transition Metal (di) Oxides Are The Most Attractive Materials for Batteries," *Solid State Ionics*, vol. 69, pp. 201–211, (1994).

* cited by examiner

Primary Examiner—Patrick Ryan
Assistant Examiner—M. Wills
(74) Attorney, Agent, or Firm—Akin, Gump, Strauss, Hauer & Feld, L.L.P.

(57) ABSTRACT

The present invention discloses a non-aqueous electrolyte secondary battery comprising: a negative electrode containing metallic lithium or a substance at least capable of absorbing/desorbing lithium ion; a separator; a positive electrode; and an electrolyte, wherein the active material for the positive electrode comprises an oxide containing nickel element and manganese element in substantially the same atomic ratios. The non-aqueous electrolyte secondary battery thus fabricated is low cost in construction and has a high capacity.

17 Claims, 18 Drawing Sheets

SURFACE

CROSS SECTION (a)

(b)

(c)

(d)

POSITIVE ELECTRODE ACTIVE MATERIAL AND NON-AQUEOUS ELECTROLYTE SECONDARY BATTERY CONTAINING THE SAME

BACKGROUND OF THE INVENTION

The present invention relates to a positive electrode active material for a non-aqueous electrolyte battery. The invention also relates to a high-capacity and low-cost non-aqueous electrolyte secondary battery having a positive electrode containing a specific positive electrode active material.

In recent years, with the widespread use of cordless and portable AV appliances and personal computers, the need has been increasing for compact, light weight, and high energy density battery batteries as their power sources. In particular, lithium secondary batteries, because of their high energy density, are expected to be a dominant battery in the next generation battery, and their potential market is very large.

In most of the lithium secondary batteries currently available on the market, $LiCoO_2$ having a high voltage of 4 V is used as the positive electrode active material, but $LiCoO_2$ is costly because Co is expensive. Under these circumstances, research has been progressing to investigate various positive electrode active materials as substitutes for $LiCoO_2$. Among them, lithium-containing transition metal oxides has been wholeheartedly researched, and $LiNi_aCo_bO_2$ (a+b≈1) is promising, and at present, it seems that $LiMn_2O_4$ having a spinel structure has already been commercialized.

In addition, nickel and manganese as substitutes for expensive cobalt are also being researched vigorously.

$LiNiO_2$ having a layered structure, for example, is expected to have a large discharge capacity, but its crystal structure changes during charging and discharging and, therefore, it deteriorates rapidly. In view of this, it is proposed to add to $LiNiO_2$ an element that can stabilize the crystal structure during charging and discharging and thus prevent the deterioration. As the element to be added, there are exemplified, cobalt, manganese, titanium and aluminum, for example.

Prior art examples that use composite oxides of Ni and Mn as the positive electrode active material for lithium secondary batteries will be described below.

U.S. Pat. No. 5,393,622, for example, proposes a method in which a hydroxide of Ni, a hydroxide of Mn and a hydroxide of Li are dry-mixed together and baked and, after cooling them down to room temperature, the mixture is again heated and baked to obtain an active material having a composition represented by the formula $Li_yNi_{1-x}Mn_xO_2$ wherein $0≦x≦0.3$, $0≦y≦1.3$.

Further, U.S. Pat. No. 5,370,948 proposes a method in which a Li salt, a Ni salt and a Mn salt are mixed together into an aqueous solution, followed by drying and baking, to obtain an active material represented by the formula $LiNi_{1-x}Mn_xO_2$ wherein $0.005≦x≦0.45$.

Further, U.S. Pat. No. 5,264,201 proposes a dry synthesis method in which hydroxides or oxides of nickel and manganese and an excess amount of lithium hydroxide are mixed together and baked, and a synthesis method in which an oxide of nickel and manganese is added to a saturated aqueous solution of lithium hydroxide to form a slurry and the slurry is then dried and baked under a reduced pressure, to obtain an active material represented by the formula $Li_xNi_{2-x-y}Mn_yO_2$ wherein $0.8≦x≦1.0$, $y≦0.2$.

Furthermore, U.S. Pat. No. 5,629,110 proposes a dry mixing synthesis method which uses β-$Ni(OH)_2$ to obtain an active material represented by the formula $LiNi_{1-x}Mn_xO_2$ wherein $0<x≦0.2$, $y≦0.2$.

Japanese Unexamined Patent Publication No. Hei 8-171910 proposes a method in which manganese and nickel are coprecipitated by adding an alkaline solution into an aqueous solution mixture of manganese and nickel, then lithium hydroxide is added and the resulting mixture is baked, to obtain an active material represented by the formula $LiNi_xMn_{x-1}O_2$ wherein $0.7≦x≦0.95$.

Further, Japanese Unexamined Patent Publication No. Hei 9-129230 discloses a preferred particulate active material having the composition represented by the formula $LiNi_xM_{x-1}O_2$ wherein M is at least one of Co, Mn, Cr, Fe, V and Al, $1>x≦0.5$, and shows a material with $x=0.15$ as the active material containing Ni and Mn.

Further, Japanese Unexamined Patent Publication No. Hei 10-69910 proposes an active material synthesized by a coprecipitation synthesis method, represented by the formula $Li_{y-x1}Ni_{1-x2}M_xO_2$ wherein M is Co, Al, Mg, Fe, Mg or Mn, $0<x_2≦0.5$, $0≦x_1<0.2$, $x=x_1+x_2$, and $0.9≦y≦1.3$. This patent publication describes that the discharge capacity is inherently small if M is Mn, and the original function of the positive electrode active material intended to achieve a high-capacity lithium secondary battery is dismissed if $x_2$ is more than 0.5. $LiNi_{0.6}Mn_{0.4}O_2$ is exemplified as a material having the highest proportion of Mn.

U.S. Pat. No. 5,985,237 discloses a production method for $LiMnO_2$ having a layered structure, but this is essentially a 3 V level active material.

All the prior art examples disclosed in the above U.S. Patents and Japanese Unexamined Patent Publications are intended to improve the electrochemical properties such as the cycle characteristics of $LiNiO_2$ by adding a trace amount of an element into $LiNiO_2$, while retaining the characteristic properties of $LiNiO_2$ itself. Accordingly, in the active material obtained after the addition, the amount of Ni is always larger than that of Mn, and the proportion of Ni:Mn=0.8:0.2 is proposed in many cases. As an example of a material having a proportion with a highest amount of Mn, Ni:Mn=0.55:0.45 is disclosed.

However, in any of these prior art examples, it is difficult to obtain a composite oxide having a single-phase crystal structure since $LiNiO_2$ is separated from $LiMnO_2$. This is because $Mn^{2+}$ tends to be oxidized to $Mn^{3+}$ during coprecipitation and $Mn^{3+}$ is difficult to form a homogenous composite oxide with $Ni^{2+}$.

As described above, as a substitute material for the currently commercialized high voltage 4V $LiCoO_2$.$LiNiO_2$ and $LiMnO_2$ as high-capacity and low-cost positive electrode active materials having a layered structure like $LiCoO_2$ has been researched and developed.

However, the discharge curve of $LiNiO_2$ is not flat, and the cycle life is short. In addition, the heat resistance is low, and using this material as a substitute material for $LiCoO_2$ would involve a severe problem. In view of this, improvements have been attempted by adding various elements to $LiNiO_2$, but satisfactory results have not been obtained yet. Further, it is only possible to obtain a voltage of 3 V with $LiMnO_2$ therefore, low-capacity $LiMn_2O_4$ which does not have a layered structure but has a spinel structure is beginning to be researched.

Accordingly, an object of the present invention is to provide a positive electrode active material capable of solving the above-mentioned problems. Also, another object of the invention is to obtain a positive electrode active material that has a voltage of 4 V equivalent to that of $LiCoO_2$, exhibits a flat discharge curve, and is higher in capacity and lower in cost than $LiCoO_2$. Further, still another object of the present invention is to provide a non-aqueous electrolyte secondary battery using such a positive electrode active material and achieving a high capacity and excellent charge/discharge efficiency.

BRIEF SUMMARY OF THE INVENTION

The present invention relates to a positive electrode active material for a non-aqueous electrolyte battery comprising a crystalline particle of an oxide, said oxide containing nickel element and manganese element in substantially the same atomic ratios and having a crystal structure of a rhombohedral structure, which belongs to rhombohedral crystal system.

In other words, in the crystalline particle, nickel atoms and manganese atoms are uniformly or homogeneously dispersed.

It is effective that the crystal structure of the crystalline particle belongs to the hexagonal crystal system, and the length of c-axis is not shorter than 14.25 angstroms.

It is effective that the oxide further contains a lithium element.

It is effective that the crystalline particle is in the shape of sphere.

Further, it is effective that the positive electrode active material comprises a mixture of a crystalline particle of the oxide having a particle size of 0.1 to 2 $\mu$m and a secondary particle of the crystalline particle having a particle size of 2 to 20 $\mu$m.

Further, it is preferable that the crystal structure of the crystalline particle is a rhombohedral structure in which the volume of a unit lattice decreases through oxidation.

Further, it is effective that an error range between an atomic ratio of nickel element and an atomic ratio of manganese elements is within not larger than 10 atomic percent.

Further, it is effective that the lithium element, nickel element and manganese element contained in the oxide satisfy the relation: $0.97 \leq Li/(Ni+Mn) \leq 1.03$.

Further, the present invention also relates to a method for producing a positive electrode active material for a non-aqueous electrolyte battery, comprising the steps of:

introducing an aqueous solution containing a nickel salt and a manganese salt and an alkaline solution simultaneously into a reactor, and coprecipitating the nickel and the manganese while passing an inert gas therethrough to obtain a nickel manganese hydroxide and/or a nickel manganese oxide;

mixing the nickel manganese hydroxide and/or the nickel manganese oxide with a lithium compound to obtain a mixture; and baking(sintering) the mixture to obtain a positive electrode material.

In the production method, it is effective that the temperature of the reactor is 30 to 50° C.

Further, it is effective that each of the nickel salt and the manganese salt is sulfate.

Further, it is effective that the alkaline solution is an aqueous solution containing a mixture of sodium hydroxide and ammonia water.

Further, it is effective that the lithium compound is lithium carbonate and/or lithium hydroxide.

Further, it is effective that the temperature of the baking is not lower than 550° C.

Further, it is effective that the temperature of the baking is not lower than 950° C., and the mixture after the baking is subsequently baked again at a temperature of 700 to 780° C.

The present invention further relates to a method for producing a positive electrode active material for a non-aqueous electrolyte battery, comprising the steps of:

dry mixing $LiOH.H_2O$, $Ni(OH)_2$ and $MnOOH$, each having a particle size of not larger than 0.3 $\mu$m to obtain a mixture; and baking the mixture to obtain a positive electrode active material.

In this invention, the temperature of the baking is not lower than 550° C.

The present invention also relates to a non-aqueous electrolyte secondary battery comprising: a negative electrode containing, as a negative electrode active material, metallic lithium and/or a substance at least capable of absorbing (intercalate) and desorbing (deintercalate) lithium ion; a separator; a positive electrode containing the above-mentioned positive electrode active material; and an electrolyte.

In accordance with the present invention, a non-aqueous electrolyte battery can be provided that can effectively utilize an inexpensive nickel manganese composite oxide as the positive electrode active material, and that achieves a high capacity and excellent charge/discharge efficiency.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
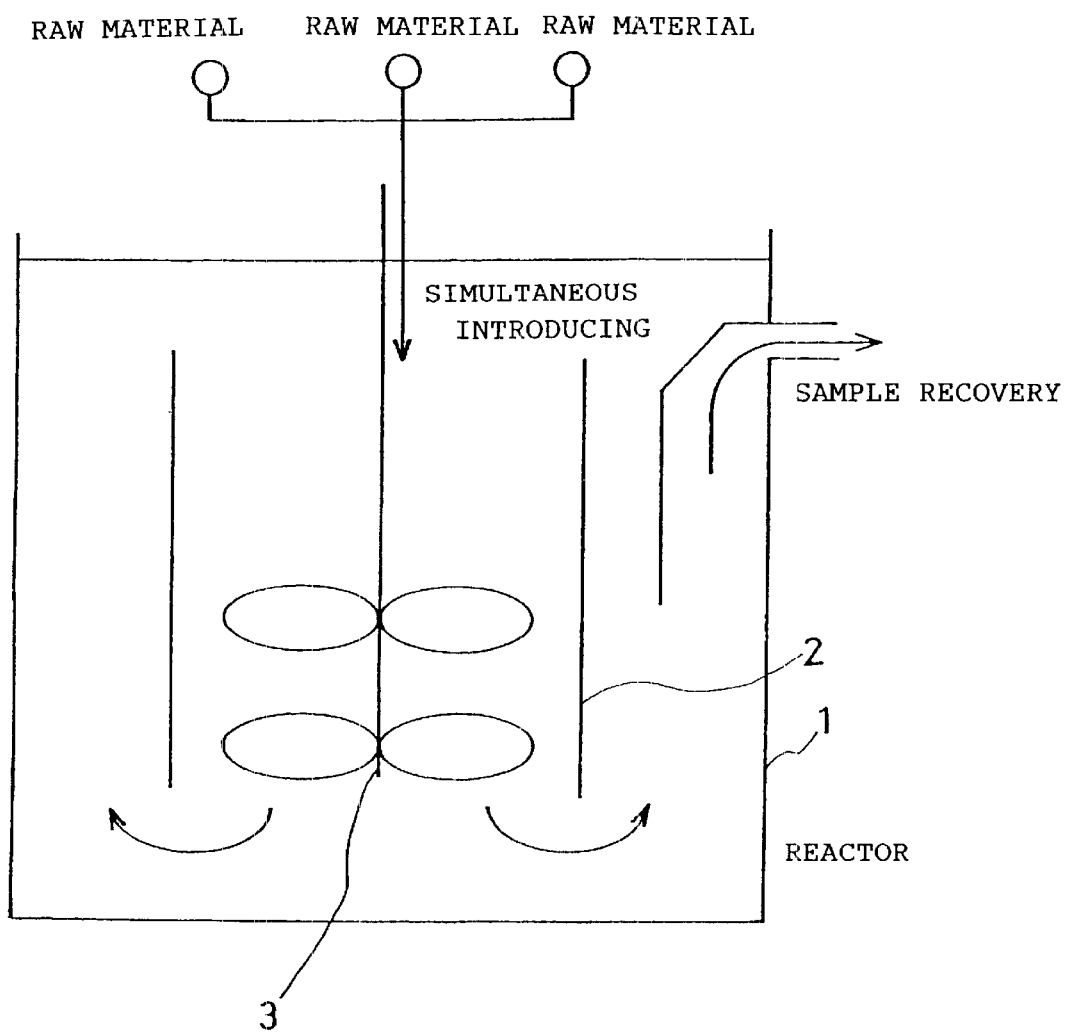
FIG. 1 is a schematic diagram showing experimental equipment used to produce a positive electrode active material by coprecipitation in accordance with the present invention.

In view of the earlier described problems associated with the prior art, the inventors of the present invention have found a positive electrode active material comprising a nickel manganese composite oxide, which exhibits a novel function, by employing a technique in which a nickel compound and a manganese compound are dispersed uniformly at the atomic level to form a solid solution, rather than the technique in which the properties of $LiNiO_2$ or $LiMnO_3$ is improved by adding other elements.

More specifically, many elements have been proposed as the element to be added in the prior art, but no specific technical descriptions have been given as to which element is preferable. In view of this, the present inventors have conducted extensive studies on combinations of various elements and their incorporating and mixing ratios, and have found that a novel function can be obtained when nickel and manganese are combined in substantially the same atomic ratios, and this finding has led to the present invention.

Preferably, coprecipitation is used to form a solid solution of nickel and manganese at the atomic level. When forming the solid solution by coprecipitation, each of nickel and manganese in the aqueous solution is in the state of bivalent ion. It is desirable that the elements retain the bivalent state and be coprecipitated by being simultaneously neutralized with the alkali added dropwise. However, manganese is oxidized very easily; even with a trace amount of oxygen dissolved in the aqueous solution, Mn is oxidized and converted into the trivalent state. When the bivalent ion and trivalent ion exist, the solid solution formation at the atomic level becomes insufficient.

To avoid the above situation, in the present invention it is preferable that an inert gas such as nitrogen or argon is introduced in the form of bubble into the aqueous solution to remove the residual oxygen dissolved in the solution or that a reducing agent is added in advance into the aqueous solution. The difference of the present invention from the coprecipitation method of the prior art is, therefore, that coprecipitation takes place in an inert atmosphere.

The positive electrode active material in accordance with the present invention comprises a crystalline particle of an oxide containing nickel element and manganese element in substantially the same atomic ratios, and preferably the oxide contains lithium element.

Crystallographically, the oxide has a layered structure, and the crystal structure belongs to the rhombohedral crystal system and has a single-phase structure, in which nickel atom and manganese atom are dispersed uniformly at the atomic level. The reason that the combination of nickel and manganese is preferable is as follows.

That is, when the above oxide is used for the positive electrode active material for a lithium secondary battery, Li enters and leaves the crystal as the battery is charged and discharged. In a conventional active material, the electronic conductivity of the active material decreases at the end of discharge, and the discharge curve slope offs. This is presumably due to the polarization caused by the reduction of the electronic conductivity.

By contrast, when nickel and manganese are combined, since the inherent electron states of the respective elements interact with each other, the electronic conductivity can be prevented from decreasing remarkably at the end of discharge. As a result, desirable flat charge and discharge curves can be obtained.

On the other hand, improvements must be made in the production process for forming the above oxide. Usually, to synthesize a composite oxide, hydroxides, oxyhydroxides or oxides each containing the respective elements are mixed together and baked.

When producing $LiNi_{0.5}Mn_{0.5}O_2$, the representative composition of the present invention, $LiOH.H_2O$, $Ni(OH)_2$, and $MnOOH$ are thoroughly mixed in the ratio of 2:1:1 (molar ratio) and the mixture is baked at a suitable temperature enough to allow the reaction to proceed.

Such a dry mixing synthesis method is described in U.S. Pat. Nos. 5,393,622, 5,370,948 and 5,264,201, but in any patent, the Mn content is low, and a description is given stating that the dry synthesis method serves the purpose.

However, the present inventors have found that when the dry mixing synthesis method described in the above U.S. patents is used, it is difficult to form a solid solution containing nickel and manganese at the atomic level and a single-phase structure is extremely difficult to obtain.

On the other hand, the present inventors have found that when the powder mixture containing the above-mentioned three kinds of compound is in the form of very fine particle, a single-phase structure can be obtained by using the particle, for example, of 0.3 μm or smaller, insofar as X-ray patterns are observed.

It has also been found that compared with the above dry mixing baking method, a further ideal oxide can be obtained if the coprecipitation method described below is employed.

Recent studies have revealed that good results can be obtained if a wet coprecipitation method is used for the formation of a nickel composite oxide. For example, Japanese Unexamined Patent Publication No. Hei 8-171910 discloses a nickel manganese coprecipitation method. Coprecipitation is a technique for obtaining a composite hydroxide by simultaneously precipitating two different elements in an aqueous solution utilizing a neutralization reaction. Until now, the conventional coprecipitation process sufficed for the purpose, since only a portion of the nickel had to be replaced by a small amount of other element. However, if nickel element and manganese element are to be incorporated in substantially the same amounts to form a solid solution at the atomic level, as in the present invention, the conventional method cannot serve the purpose and more advanced techniques are required. Further, when the intended lithium-containing composite oxide is obtained by causing a hydroxide obtained by precipitation to react with lithium, a large difference occurs in the electrochemical properties depending on the particle shape when the oxide is used for a battery. With the conventional method, it is difficult to control the difference. Furthermore, the baking temperature must be chosen carefully since it greatly influences the electrochemical properties. The conditions for these synthesis will be described in further detail in the description of examples.

In the present invention, choosing the combination of nickel and manganese has important meaning, and the invention differs from the prior art which adds trace amount of various elements to improve the properties of $LiNiO_2$.

The ideal ratio of nickel and manganese is 1:1. A compound having such a ratio has not been achieved in practice in the prior art. The synthesis method of the present invention is an improvement of the coprecipitation method, which is carried out in a liquid phase. Since not only the particle shape of the obtained active material but the electrochemical properties thereof change depending on the coprecipitation conditions and subsequent baking conditions, the conditions should be selected in accordance with the purpose.

(1) Positive Electrode Active Material

A method for producing a positive electrode active material by coprecipitation will be described. A schematic view of experimental equipment used here is shown in FIG. 1. Nickel sulfate and manganese sulfate were used.

A mixture of a 1.2 mol/l $NiSO_4$ aqueous solution and a 1.2 mol/l $MnSO_4$ aqueous solution, 4.8 mol/l NaOH aqueous solution and 4.8 mol/l $NH_3$ solution are simultaneously charged into a reactor 1, respectively at a rate of 0.5 ml/min. A cylindrical tube 2 is placed in the reactor 1, and a stirring rod 3 is placed in the tube.

A hydroxide is obtained within the tube through coprecipitation, and at the same time, a force directed downward (toward the bottom of the reactor) is applied to the hydroxide by the stirring rod placed in the tube. Microcrystals of the hydroxide collide with each other under the application of the force, causing crystal growth and resulting in the formation of a crystalline particle.

Such a particle passes along the outside of the tube, as shown by the arrows in FIG. 1, and overflows outside the system. The particle thus obtained is substantially spherical in shape because of the colliding force and the like.

At this time, the temperature of the reactor is held at 30 to 50° C.

If oxygen is contained and dissolved in the aqueous solution, manganese is easily oxidized, turning the bivalent ion state into the trivalent ion state. Therefore, to obtain β type $Ni_{1-x}Mn_x(OH)_2$, an inert gas such as nitrogen or argon must be introduced in the form of bubble to purge the dissolved oxygen from the reactor, or some kind of reducing agent must be added in order to prevent the oxidation of the manganese.

On the other hand, if the formation of α type $Ni_{1-x}Mn_x(OH)_2 \cdot xSO_4^{2-} \cdot yH_2O$ does not present any problem, or if it is desired to produce this composition, the oxygen dissolved in the solution may be advantageously employed.

According to the experiment conducted by the present inventors, it was found as the result of examining X-ray diffraction images that a hydroxide with higher crystallinity could be obtained at a lower temperature region, i.e., at about 30° C. The illustrated reactor is industrially very useful since the composite hydroxide can be produced continuously and at high speed. However, the particle size distribution of the obtained particles spreads widely, resulting in a mixture of particles having various sizes, large ones and small ones.

Another disadvantage is that the large spherical particle exceeding 10 μm tends to be accumulated in the bottom of the reactor, making it difficult to take it outside, and therefore, the particle size cannot be made large enough.

Figure 2:
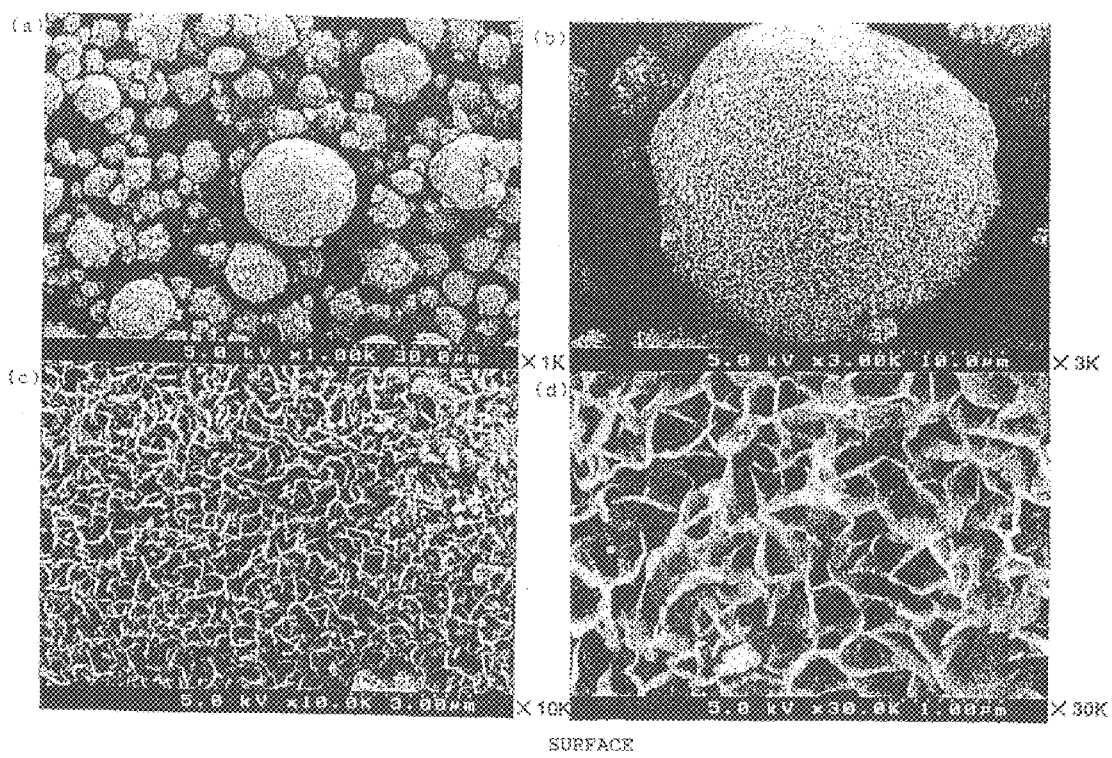
FIG. 2 is a set of SEM (scanning electron microscope) photographs showing the surface of a positive electrode active material particle obtained in accordance with the present invention.
Figure 3:
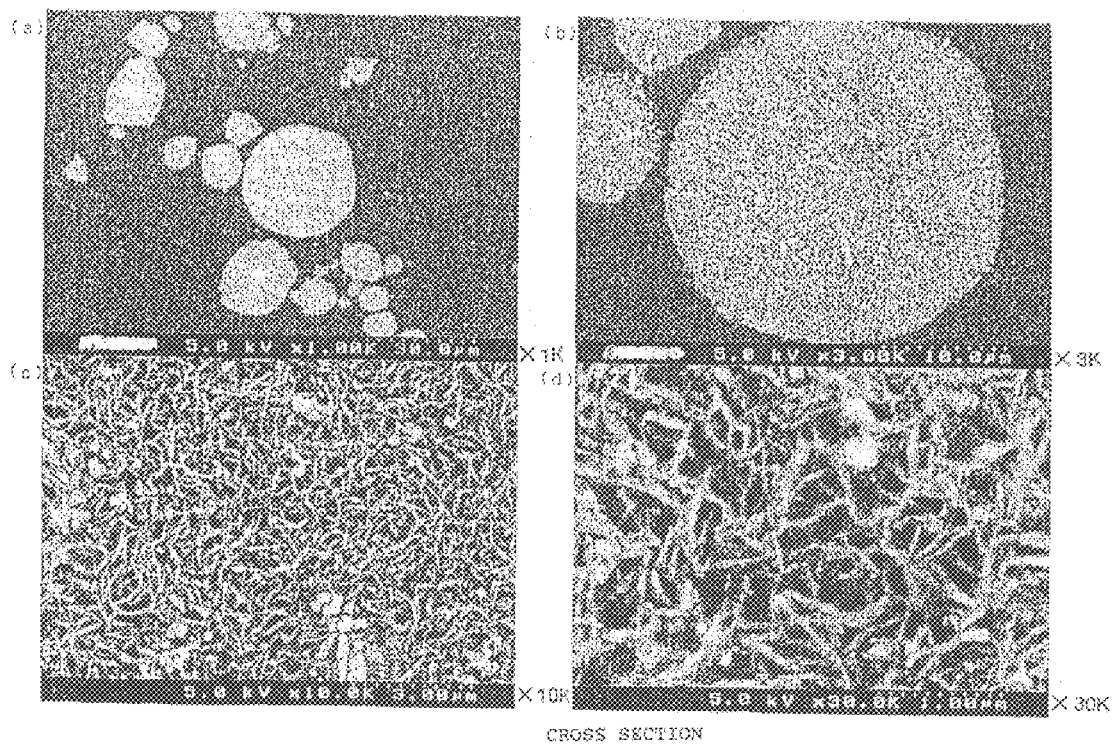
FIG. 3 is a set of SEM photographs showing cross sections of the positive electrode active material particle obtained in accordance with the present invention.

FIG. 2 is a set of SEM (scanning electron microscope) photographs showing the surface of a representative particle obtained in the above reactor. FIG. 3 is a set of SEM (scanning electron microscope) photographs showing cross sections of the representative particle obtained in the above reactor. The magnifications of the photographs are ×1000, ×3000, ×10000, and ×30000.

The particle is substantially spherical in shape as shown in (a) and (b) of FIG. 2 and (a) and (b) of FIG. 3. Also, (c) and (d) of FIG. 2 reveal that convex and concave portions, i.e., asperities like wrinkles are uniformly formed on the surface of the particle, and that the particle is porous. From the cross sectional SEM photographs of the particle shown in FIG. 3, it can be seen that uniform wrinkles like those formed on the surface are observed throughout the interior of the particle, revealing that the particle is a porous material having pores with substantially the uniform size. For reference purposes, the results of the chemical analysis (elemental analysis) of the obtained composite oxide are shown in Table 1 as an example.

TABLE 1

| Composition | |
|---|---|
| Ni(%) | 31.7 |
| Ni(mol/g) | 0.00540 |
| Co(%) | 0.054 |
| Fe(%) | 0.053 |
| Cu(%) | ≦0.001 |
| Mn(%) | 28.5 |
| Mn(mol/g) | 0.00519 |
| Na(%) | 0.17 |
| Cl(%) | ≦0.05 |
| $So_4$(%) | 0.073 |
| Tap density(g/cc) | 0.65 |
| Bulk density(g/cc) | 0.44 |
| Particle size(μm) | 12.0 |
| Mn:Ni ratio | 0.98:1.02 |

Figure 4:
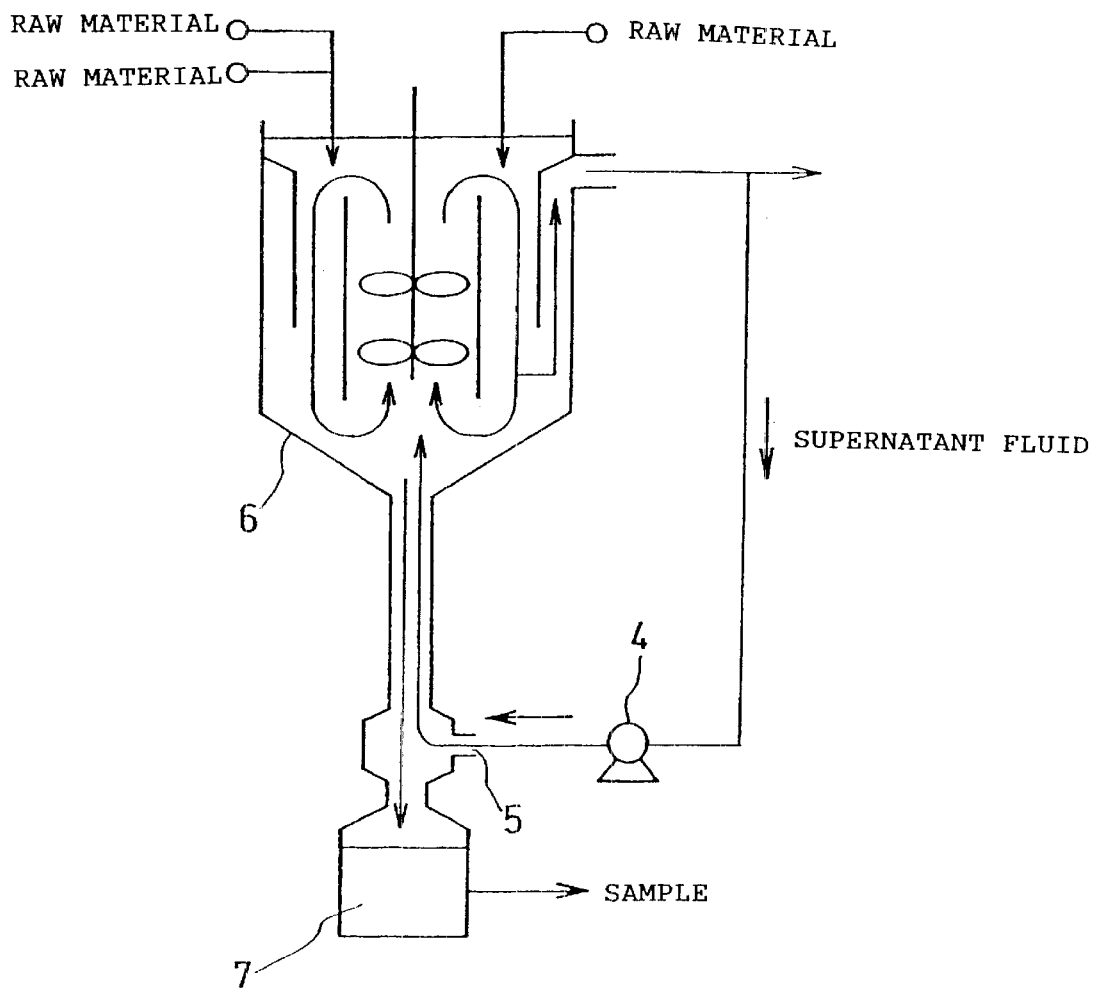
FIG. 4 is a schematic diagram showing another experimental equipment used to produce a positive electrode active material by coprecipitation in accordance with the present invention.

To obtain a spherical composite hydroxide having a higher density and a larger particle size, the production method should be modified as described hereinafter. FIG. 4 is a schematic diagram showing the construction of a modified experimental equipment. In the equipment shown in FIG. 4, the solution mixture is introduced into the reactor 6 by using a pump 4 through a supply port 5 and flowed upward from the bottom of the reactor 6, thus causing the coprecipitating microcrystals falling downward to collide with each other. A collector 7 is provided in the lower part of the equipment. Therefore, a crystalline particle grown to a certain particle size and thus having an increased specific gravity is allowed to fall downward and collected in the collector 7 in the lower part. On the other hand, a crystalline particle not grown enough is pushed upward by the force of the solution flowed from the lower part and is thus prevented from falling downward.

With this production method, a composite hydroxide with a large particle size of 10 to 20 μm and a high tap density of 2.2 g/cm³ can be obtained.

Figure 5:
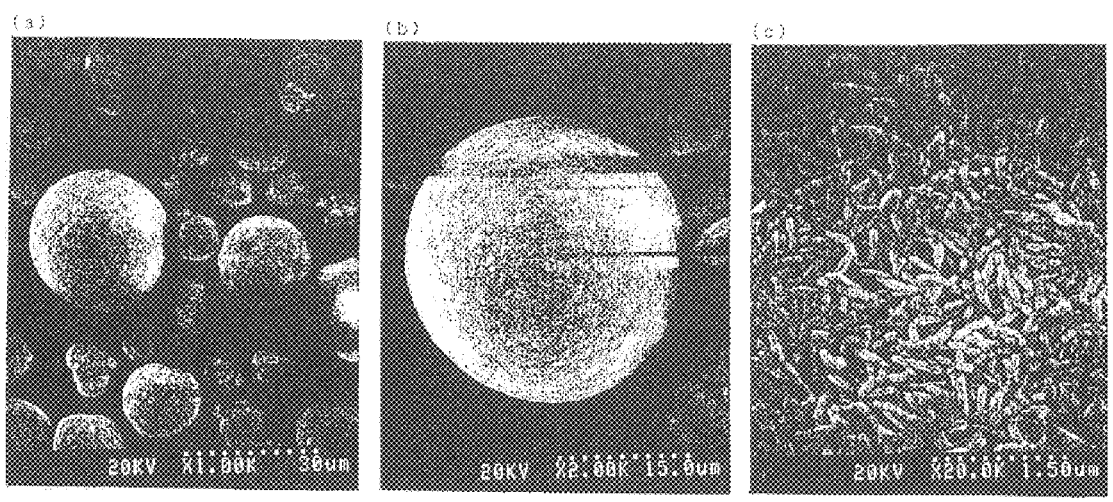
FIG. 5 is a set of SEM photographs showing a positive electrode active material particle obtained in accordance with the present invention.

FIG. 5 shows SEM photographs of a representative particle obtained by the above process. SEM photographs with magnifications ×1000, ×2000 and ×20000 are shown in (a), (b) and (c) of FIG. 5, respectively. The particle here is somewhat different from the porous particle shown previously; that is, the particle is filled with crystallites at high density and the size of the spherical particle is large. The compound constituting the crystalline particle may be left in the form of a hydroxide, but in case where aging during storage becomes a problem, the hydroxide may be turned into an oxide by drying and baking at a low temperature.

As described above, according to the present invention, not only the porous spherical particle but also the high density spherical particle can be produced as desired by changing the coprecipitation conditions according to the purpose. Furthermore, the particle size can be controlled as desired from microscopic size to the size as large as about 20 μm. Crystallinity, which can be observed using X-ray, can also be controlled by suitably changing the reactor temperature.

Next, the obtained hydroxide or oxide is mixed with a lithium source such as lithium hydroxide, and the obtained mixture is baked to obtain $Li_yNi_{1-x}Mn_xO_2$, the intended positive electrode active material for a lithium secondary battery. At this time, lithium hydroxide may be used as the lithium source. When lithium carbonate was used, it was found that though it was possible to obtain the intended single-phase structure, lithium hydroxide was preferable from the viewpoint of particle size controllability and crystallinity.

It is desirable that the lithium be supplied uniformly throughout the interior of the spherical nickel manganese hydroxide. Lithium hydroxide is ideal, because when lithium hydroxide is used, the lithium hydroxide is melted at a relatively low temperature, causing the lithium to be supplied into the interior of the nickel manganese hydroxide particle, and as the temperature rises, oxidation reaction gradually proceeds from the exterior surface of the particle.

On the other hand, when lithium carbonate is used, decarboxylation must occur first, and this reaction occurs at high temperatures compared with the case of lithium hydroxide. As a result, decarboxylation reaction and oxidation reaction occur almost simultaneously. This is presumably the reason that lithium hydroxide is advantageous for use from the viewpoint of particle size controllability and crystallinity.

Next, the preferred baking conditions will be described.

The nickel manganese composite hydroxide and lithium hydroxide are thoroughly mixed together in a dry system. Ideally, the lithium hydroxide and nickel manganese composite hydroxide are mixed so that the atomic ratios of Li, Ni and Mn satisfies Li/(Ni+Mn)=1. However, the ratio may be increased or decreased to a certain extent in order to control the baking temperature, the particle shape and the like. For example, when the baking temperature is high, or when the primary particle size after baking is to be increased, the amount of lithium element in the mixture is somewhat increased. In this case, an increase or decrease of about 3% is preferable.

Baking should be performed in an oxidizing atmosphere. In this example, studies were conducted using an ordinary air atmosphere.

Figure 6:
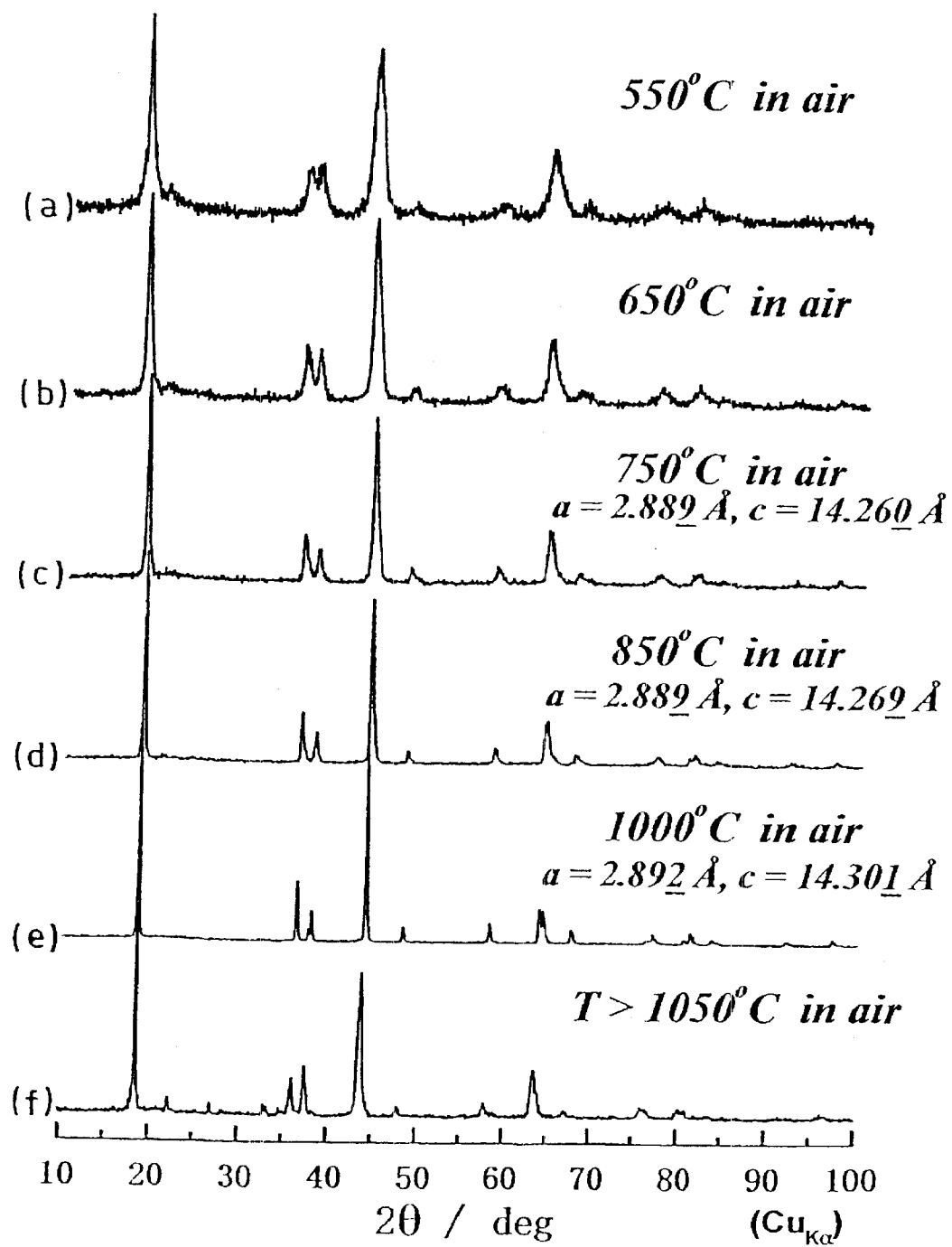
FIG. 6 is a diagram showing X-ray diffraction images of lithium-containing nickel manganese oxides obtained when baked at various temperatures.

The baking temperature is important. FIG. 6 shows X-ray diffraction images of lithium-containing nickel manganese oxides obtained when baked at various temperatures.

The baking time was set constant at 15 hours. The results obtained at baking temperatures of 550, 650, 750, 850, 1000, and over 1050° C. are shown in (a), (b), (c), (d), (e) and (f) of FIG. 6 respectively. It is shown that, within this temperature range, materials having substantially the same structure can be obtained. As for the crystallinity, it can be seen that the peak of the X-ray diffraction becomes sharper as the baking temperature increases, providing higher degree of crystallinity. Even at a high temperature exceeding 1000° C., thermal decomposition of the material does not occur. Further, when the crystal structure is analyzed using this X-ray diffraction pattern, it is shown that the structure belongs to the rhombohedral crystal system.

The structure was then converted to the hexagonal crystal system, and was attributed to Miller indices. It was shown that all peaks could be attributed to Miller indices, proving the formation of a single-phase structure. However, when the material was baked at 1000°C., oxygen may be somewhat lacking at the material surface; therefore, to reload the lost oxygen into the material, it is preferable that, after baking at 1000° C., the material is baked once again by decreasing the temperature to about 750° C.

Accordingly, the baking temperature may be set to 550° C. or over, preferably 850° C. or over, more preferably 950° C. or over, and most preferably 1000° C. or over. When the temperature is 950° C. or over, it is preferable that the material is baked once again by decreasing the temperature to about 750° C.

Figure 7:
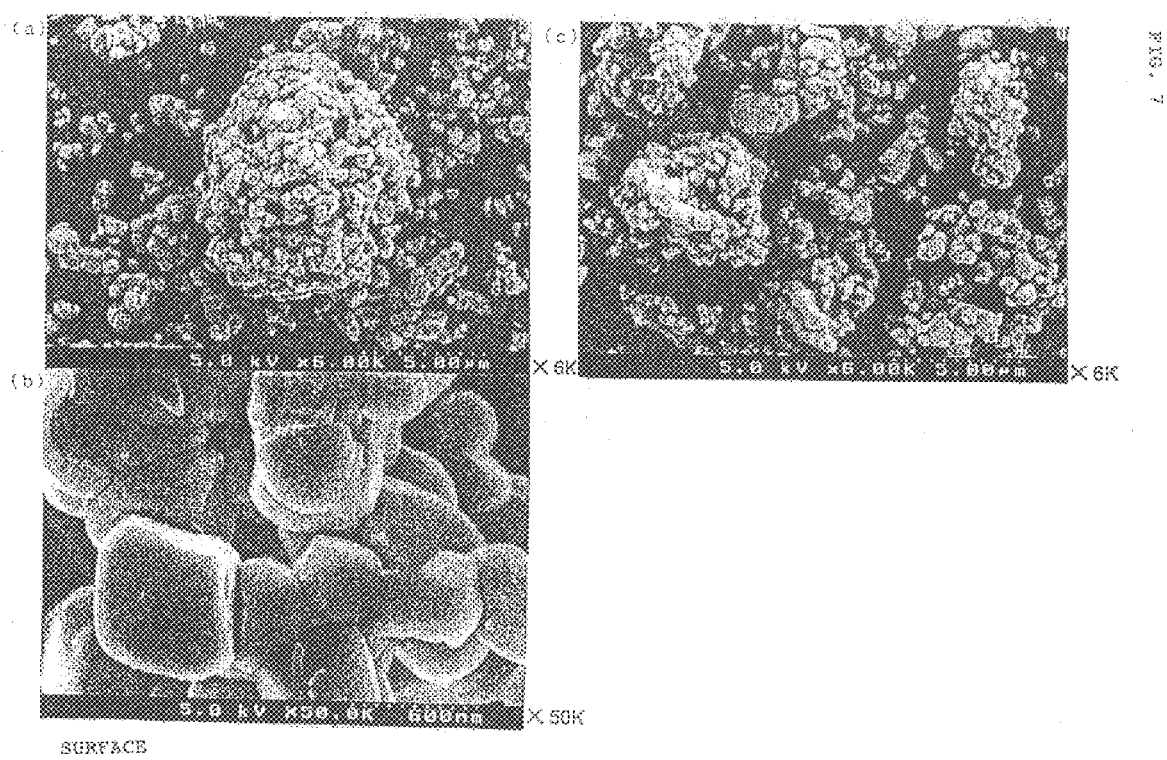
FIG. 7 is a set of SEM photographs showing the particulate shape of the lithium-containing nickel manganese oxide obtained in accordance with the present invention.
Figure 8:
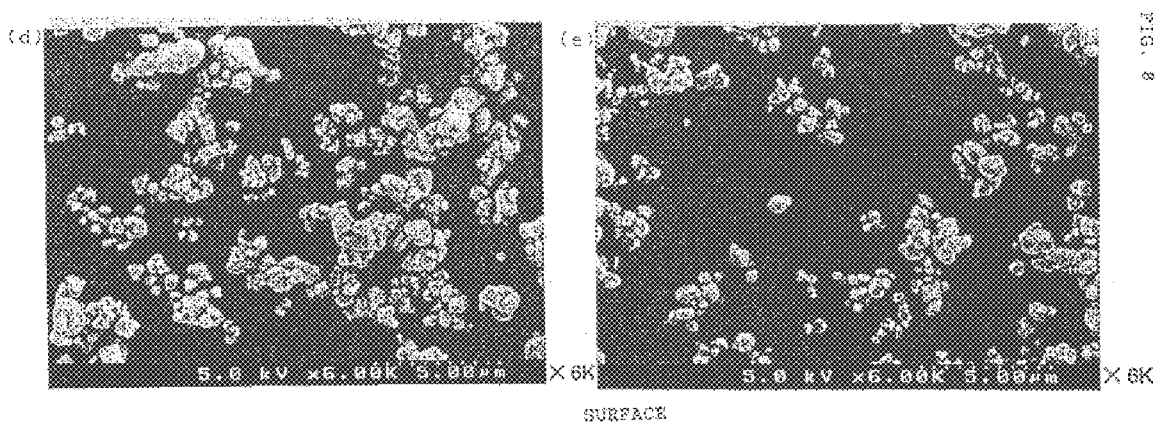
FIG. 8 is a set of SEM photographs showing the particulate shape of the lithium-containing nickel manganese oxide obtained in accordance with the present invention.

The particle shape of the lithium-containing nickel manganese oxide obtained after the baking was observed under an SEM. FIG. 7(a) shows an SEM photograph of a typical particle. As shown, the particle retains the spherical shape thereof. It is shown that 1 μm or smaller primary particles are aggregated to form a spherical secondary particle about 10 μm in size. It is also shown that each primary particle has a smooth surface, as shown in FIG. 7(b), and is filled densely. By controlling the baking temperature and other conditions, it is possible to partially collapse the secondary particle or vary the particle size or shape of the primary particles, as shown in FIG. 7(c) and FIGS. 8(d) and 8(e). It is also possible to obtain a material consisting substantially only of the primary particles, as shown in FIG. 8(e).

Figure 9:
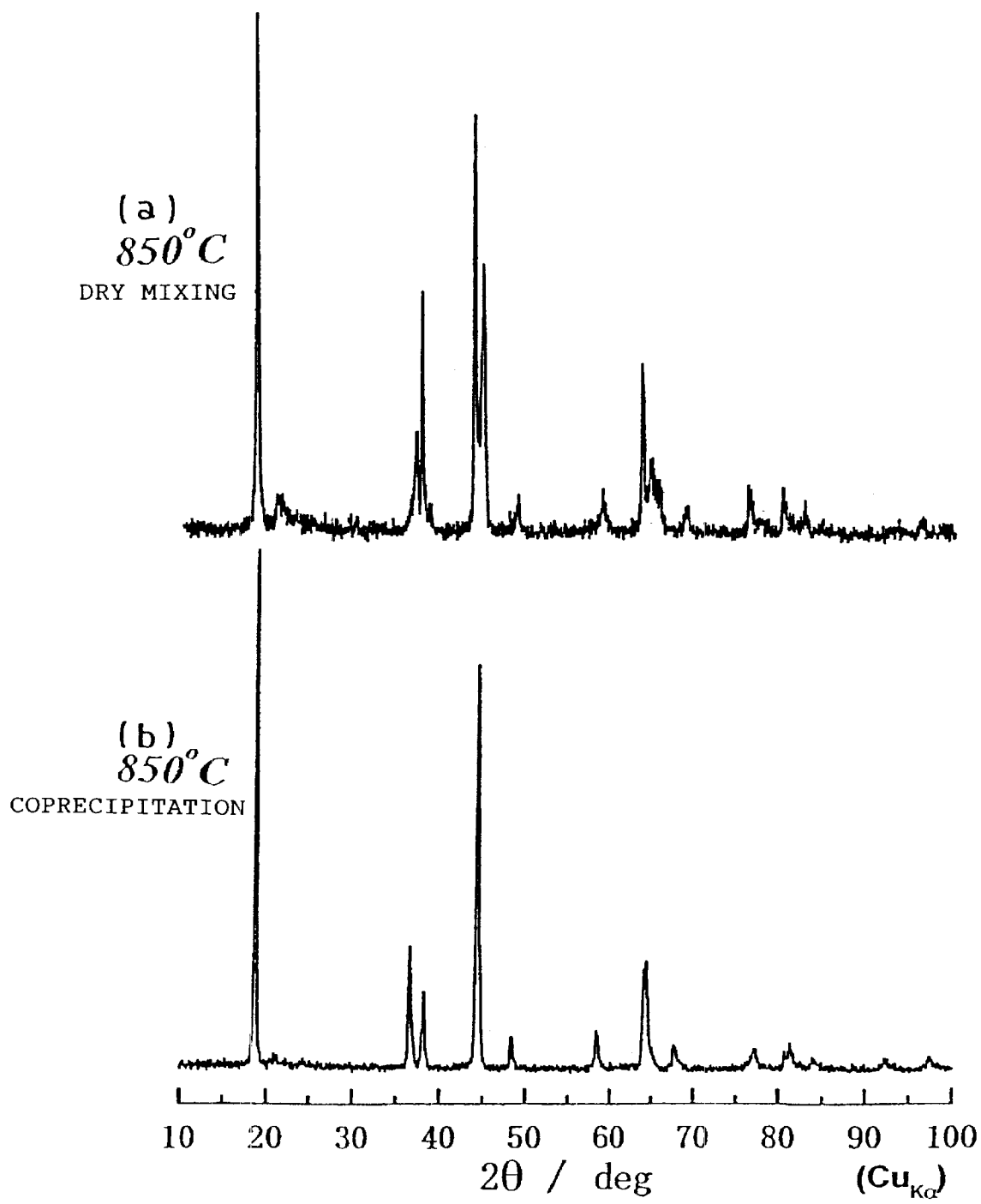
FIG. 9 is a diagram showing X-ray diffraction peaks of materials produced by a dry mixing baking method and a coprecipitation method, respectively.
Figure 10:
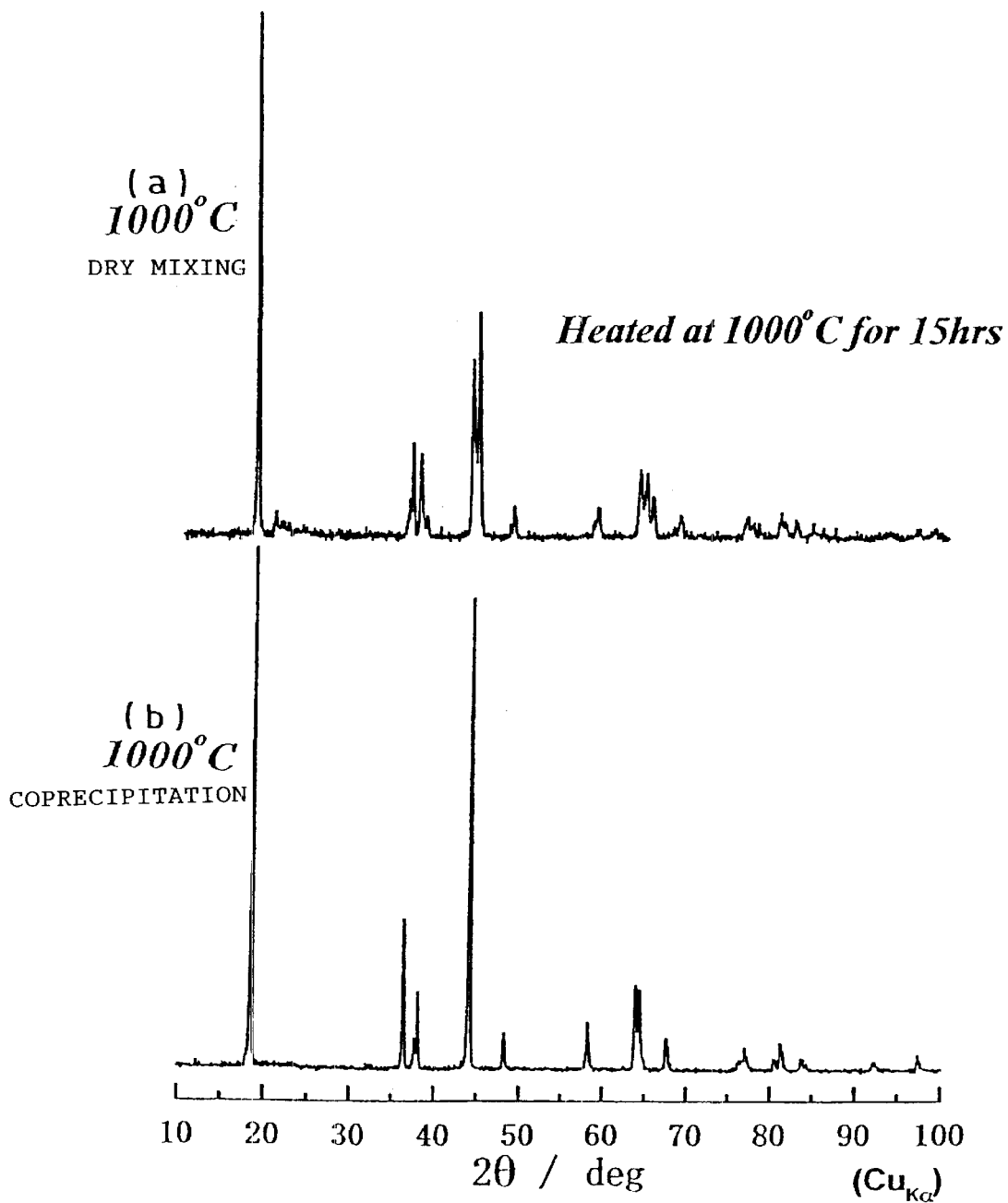
FIG. 10 is a diagram showing X-ray diffraction peaks of materials produced by the dry mixing baking method and the coprecipitation method, respectively.

For comparison purposes, data are shown for materials produced by the conventional dry mixing baking method, not by coprecipitation. $Ni(OH)_2$, MnOOH and $LiOH.H_2O$ particles, each having a few micrometers in diameter, are mixed together so as to provide a desired composition, and the mixture was likewise baked in an air atmosphere for 15 hours. The baking temperature was set to 850 or 1000° C. X-ray diffraction peaks for the produced materials are shown in FIG. 9(a) and FIG. 10(a). FIGS. 9(b) and 10(b) at the bottom show the peaks of the materials obtained by coprecipitation at 850 and 1000° C., respectively. These figures show that for the materials obtained by the dry mixing method, the peaks are split and a single-phase structure is therefore not formed. Not having a single phase could well lead to the decrease of electrochemical properties such as charge/discharge capacity and cycle life. The reason is regarded that nickel and manganese are not mixed thoroughly at the atomic level; therefore, studies were conducted by reducing the particle size of the $Ni(OH)_2$, MnOOH and $LiOH.H_2O$ particles used. As a result, it was confirmed through X-ray analysis that substantially a single-phase structure was formed when particles of about 0.3 μm or smaller size were used.

Next, the electrochemical properties of the obtained material will be described.

The electrochemical properties of the materials obtained at baking temperatures of 550 to 1050° C. as shown in FIG. 6 were evaluated by fabricating coin batteries.

Each coin battery was fabricated in accordance with the following procedure. The positive electrode active material obtained at the designated baking temperature, acetylene black as an electrically conductive material and a polyvinylidene fluoride resin (hereinafter abbreviated as "PVDF") as a binder were mixed ia weight ratio of 80:10:10, to form a molded article in the shape of sheet. The molded article was then punched in the shape of a disc and dried at a temperature of 80° C. for about 15 hours in vacuo, to obtain the positive electrode. On the other hand, a sheet made of lithium metal was punched in the shape of a disc to form the negative electrode. A microporous polyethylene film was used as the separator, and the electrolyte was prepared by dissolving 1 mole of $LiPF_6$ into a solvent mixture of EC (ethylene carbonate) and EMC (ethyl methyl carbonate) in a volume ratio of 1:3.

Using these materials, a coin battery of 2016 size (20 mm in diameter and 1.6 mm in thickness) was fabricated by a conventional method.

Figure 11:
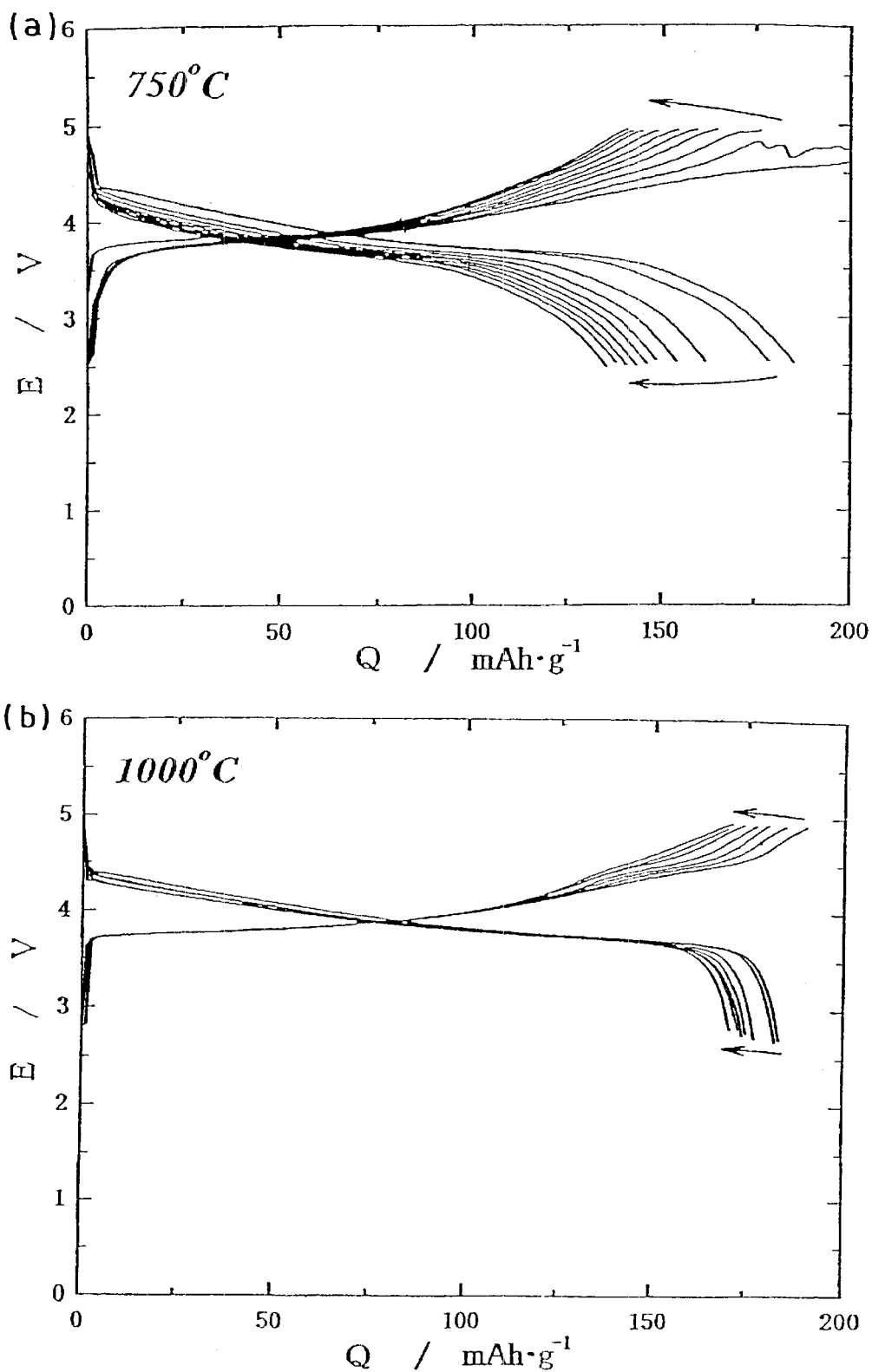
FIG. 11 is a diagram showing charge and discharge curves for coin batteries, which vary depending on the baking temperature of the positive electrode active material.

The thus fabricated coin battery was repeatedly charged and discharged within a voltage range of 3.0 to 4.5 V at a constant current rate whereby the battery was fully charged in 10 hours. For each battery, it was found that an initial charge/discharge capacity of 150 mAh/g or over could be obtained, and also that the discharge voltage was 4 V level. On the other hand, it was also found that, depending on the baking temperature, there occurred some degree of difference in the shape of the charge and discharge curves and the cycle life. Two representative patterns illustrating this are shown in FIG. 11. FIG. 11(a) shows the charge/discharge characteristics when the baking was carried out at 750° C., and FIG. 11(b) shows the same when the baking was carried out at 1000° C. The coin batteries fabricated using the materials baked at temperatures from 550 to 750° C. exhibited substantially the same characteristics as those shown in (a), while the coin batteries fabricated using the materials baked at temperatures of 850° C. and over exhibited substantially the same characteristics as those shown in (b). As shown, in the case of (a), while a sufficient charge/discharge capacity can be obtained, the discharge curve is not flat enough but gradually slopes off; that is, the capacity decreases remarkably with cycles, thus limiting the cycle life. On the other hand, in the case of (b), not only can a sufficient charge/discharge capacity be obtained, but also the shape of the discharge curve is flat and deterioration with cycles is held to a minimum, thus achieving an excellent cycle life. These differences are believed to be closely related to the development of crystallization.

As can be seen from FIG. 6 which shows the X-ray diffraction patterns for various baking temperatures, the materials obtained by baking at 850° C. or higher temperatures have sharp peaks, showing that the materials have been crystallized sufficiently. Accordingly, the baking temperature should be set to 850° C. or higher when it is desired to obtain a battery having a flat discharge curve and excellent cycle life.

Generally, it has been believed that the baking temperatures of 600 to 900° C. is preferable, as described in U.S. Pat. Nos. 5,370,948 and 5,629,110, but as shown in FIG. 11, the baking temperature of 1000° C. presented no problem; rather, higher baking temperature showed better results.

However, as previously described, when the baking is carried out at a temperature higher than 1000° C., oxygen may be somewhat lacking at the material surface; therefore, to reload the lost oxygen into the material, it is preferable that, after baking at 1000° C., the material is baked once again by decreasing baking the temperature to about 750° C.

Next, changes in the crystal structure were measured in order to analyze the reaction mechanism associated with the charge/discharge reaction of the above material. The experiment was conducted using the coin batteries fabricated in the above process.

The positive electrode active material was produced by coprecipitation, and baked at 1000° C. The charging and discharging were interrupted partway through the charging and discharging process, the coin battery was disassembled, and changes in the crystal structure of the material were analyzed using an X-ray diffraction instrument. The positive electrode taken out by disassembling the coin battery contains acetylene black as an electrically conductive material and PVDF as a binder. The analysis was conducted by placing the positive electrode in a polyethylene bag to minimize the effects of decomposition and moisture during the measurement.

Figure 12:
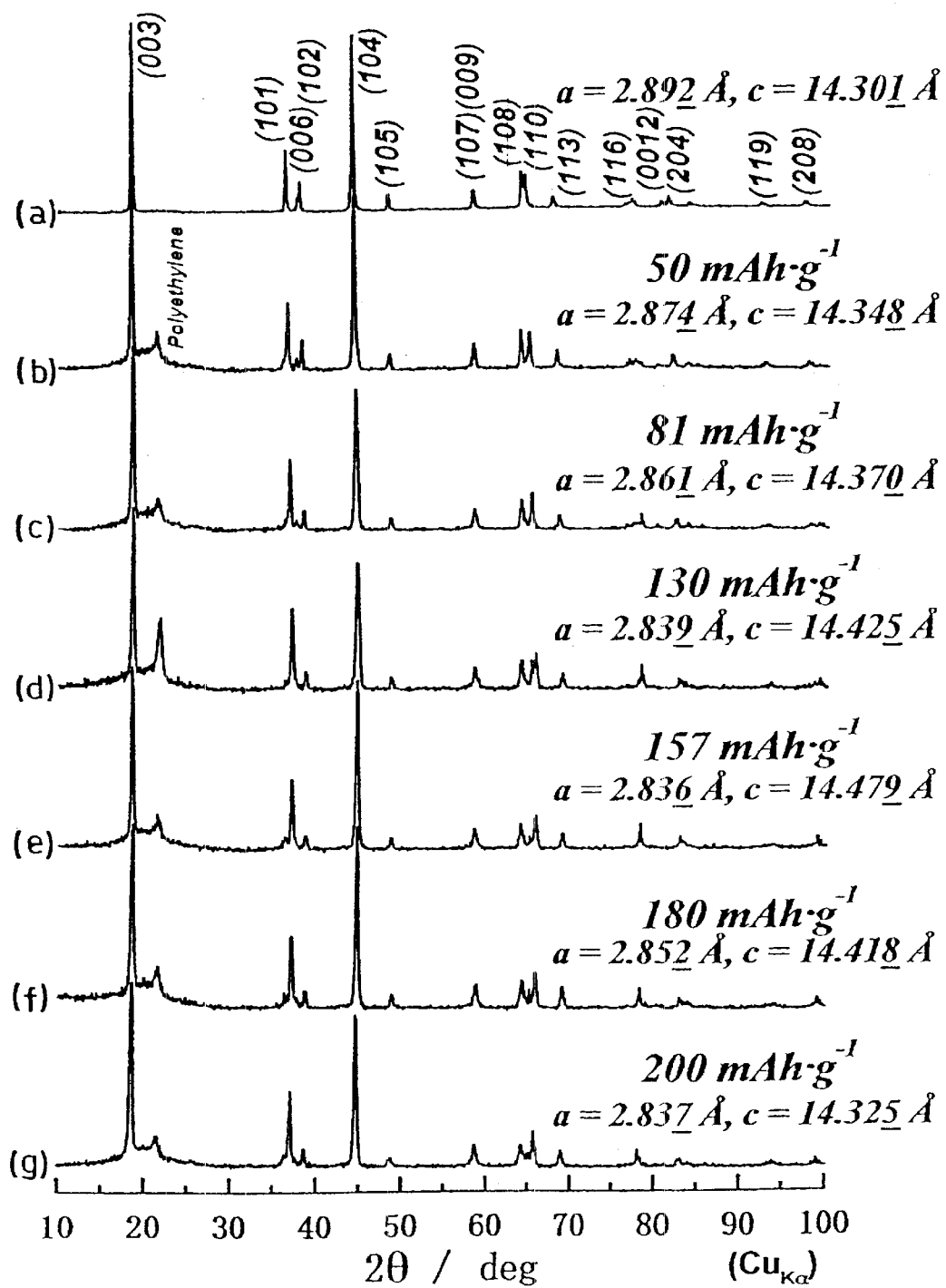
FIG. 12 is a diagram showing the results of X-ray diffraction for the positive electrode active material.

FIG. 12 shows the results of the X-ray diffraction analysis. The value of "mAh/g" shown in the figure indicates the degree of oxidation. As shown, the degree of electrochemical oxidation of the material proceeds from the top to the bottom of FIG. 12 (from (a) to (g)).

Oxidation means that Li ion is deintercalated and released from the material and, in the case of a battery, this means that the charging proceeds. Here, the crystal structure belongs to the rhombohedral crystal system. The structure was converted to the hexagonal crystal system, and was expressed by Miller indices. After that, lattice constants (a, c) in the hexagonal crystal system were obtained. Here, "a" and "c" are a-axis length and c-axis length, respectively, of a unit lattice. As is apparent from FIG. 12, the oxidation process proceeds while retaining the single phase of the hexagonal crystal system without causing a significant change in the crystal system.

Figure 13:
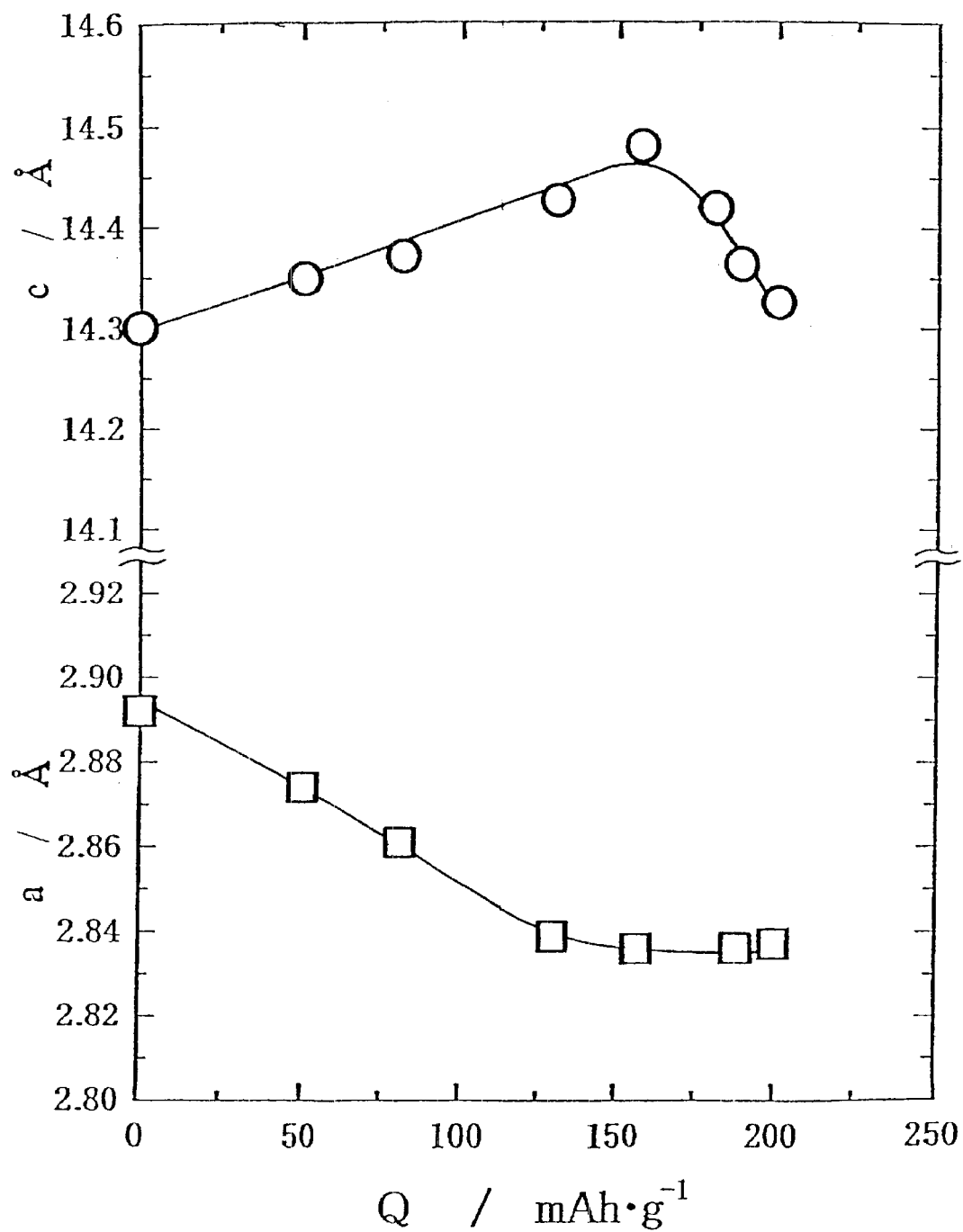
FIG. 13 is a diagram showing the change of lattice constants for the positive electrode active material.
Figure 14:
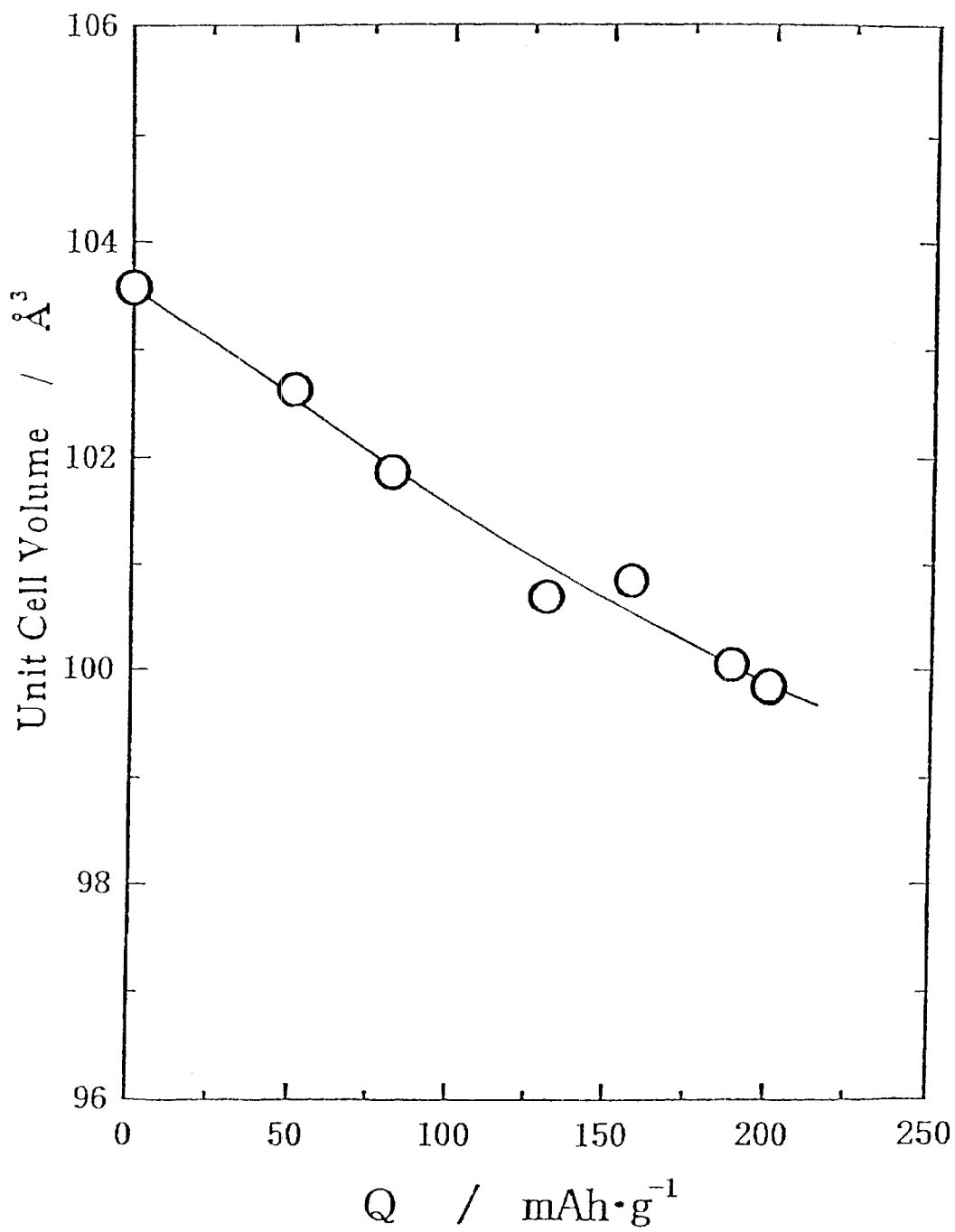
FIG. 14 is a diagram showing the volumetric change of a unit lattice, which is calculated from the a-axis length and c-axis length of the positive electrode active material.

The a-axis and c-axis change as the oxidation proceeds. These changes are shown in FIG. 13. In FIG. 13, "○" represents the c-axis and "□" represents the a-axis. FIG. 14 shows the volumetric change of the unit lattice which is calculated from the a-axis length and c-axis length.

As the oxidation proceeds, the c-axis increases until reaching a maximum value, after which it decreases ("○" in FIG. 13). The value of the c-axis is larger than those values shown in U.S. Pat. No. 5,393,622. This is presumably because nickel and manganese were mixed substantially the same atomic ratio of 1:1 to form a solid solution, thereby achieving a new function. The a-axis gradually decreases as the oxidation proceeds, and thereafter stays constant at a certain value ("□" in FIG. 13).

On the other hand, the volume of the lattice decreases linearly as the oxidation proceeds (FIG. 14). This has important value. In today's battery systems such as lithium secondary batteries, $LiCoO_2$ is used for the positive electrode and graphite for the negative electrode The lattice volume of $LiCoO_2$ in the positive electrode increases as oxidation proceeds. The graphite also increases in volume since a Li ion is intercalated between the layers thereof. In this battery system, therefore, both the positive electrode and negative electrode expand in volume as the charging proceeds. Such expansion is undesirable for batteries, because the expansion could crush the separator and, in some cases, cause internal short-circuiting. There are cases where measures have to be taken that the filling volume is reduced in advance by considering such expansion. Furthermore, in the case of a thin battery, the battery itself may expand, defeating the purpose of the thin design.

However, if an active material whose lattice volume shrinks with oxidation can be used, the expansion of the negative electrode can be absorbed to a certain degree, resolving the problem caused by the expansion of the battery as a whole.

Accordingly, the material of the present invention whose volume decreases as the charging proceeds, which is exactly the opposite of such materials as $LiCoO_2$ that expand as the charging proceeds is particularly of value when a material such as graphite that expands as the charging proceeds is used for the negative electrode.

Figure 15:
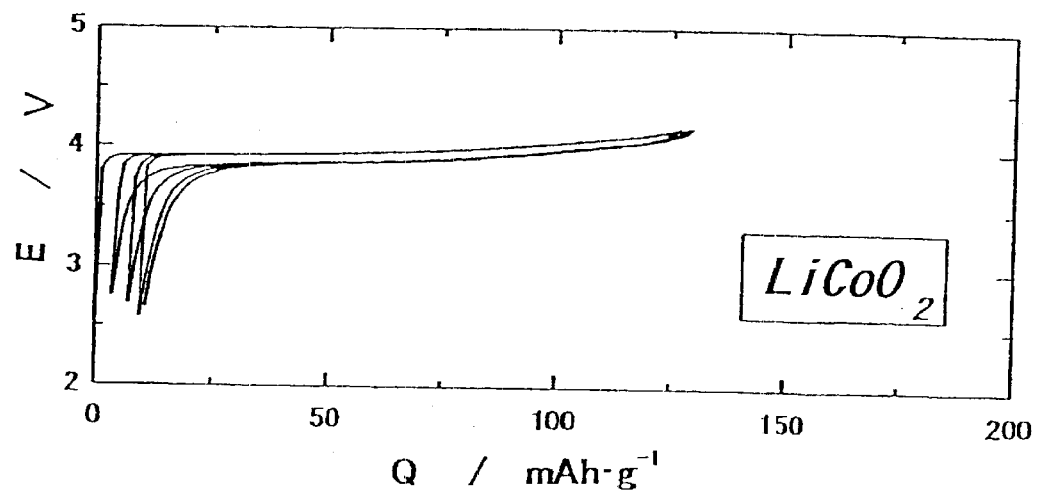
FIG. 15 is a diagram showing discharge curves for $LiCoO_2$ (a) and $LiNiO_2$ (b).
Figure 15:
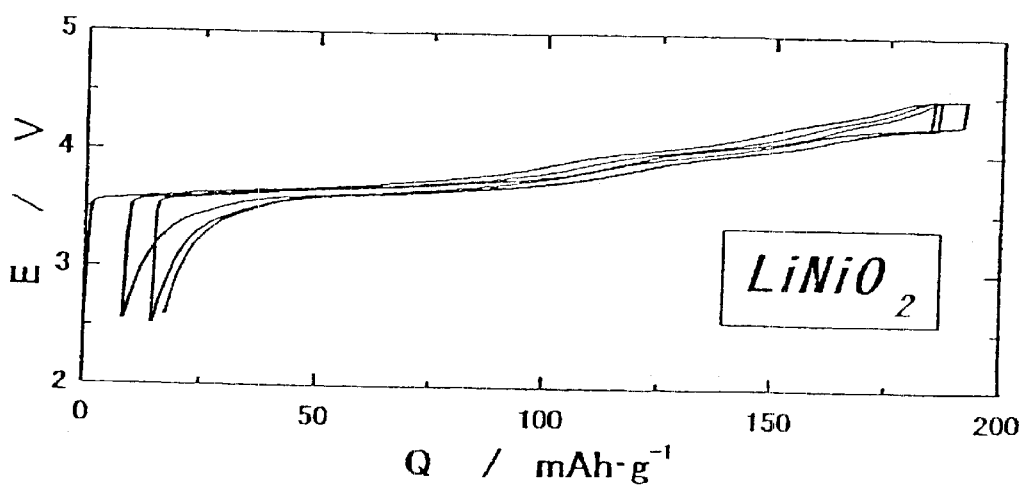
Figure 16:
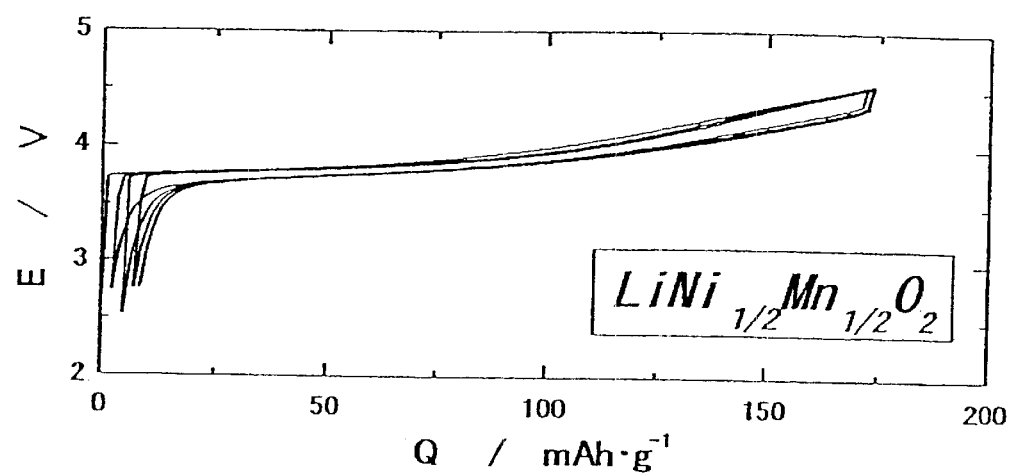
FIG. 16 is a diagram showing discharge curves for $LiNi_{1/2}Mn_{1/2}O_2$ (c) and $LiMnO_2$ (d).
Figure 16:
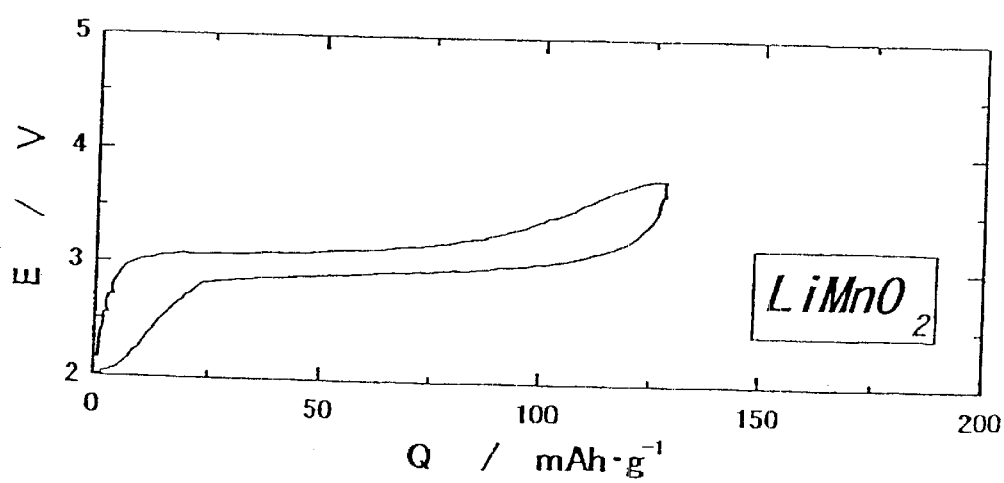

Next, the discharge voltage and the shape of the discharge curve for the above material will be described. FIG. 15 shows discharge curves for $LiCoO_2$ (a) and $LiNiO_2$ (b), and FIG. 16 shows discharge curves for $LiNi_{1/2}Mn_{1/2}O_2$ (c) and $LiMnO_2$ (d). The discharge curve for $LiNi_{1-x}Mn_xO_2$ of the present invention is flatter than the discharge curve for $LiNiO_2$. Compared with $LiMnO_2$, the charge/discharge voltage is clearly different.

This apparently shows that by incorporating nickel and manganese in substantially the same atomic ratios to form a solid solution, a novel function different from the properties of either is obtained. Therefore, the purpose and achievement of the present invention are entirely different from those of the previous researches that were conducted to find various doping elements for improving the properties of $LiNiO_2$ while retaining the basic properties thereof.

Figure 17:
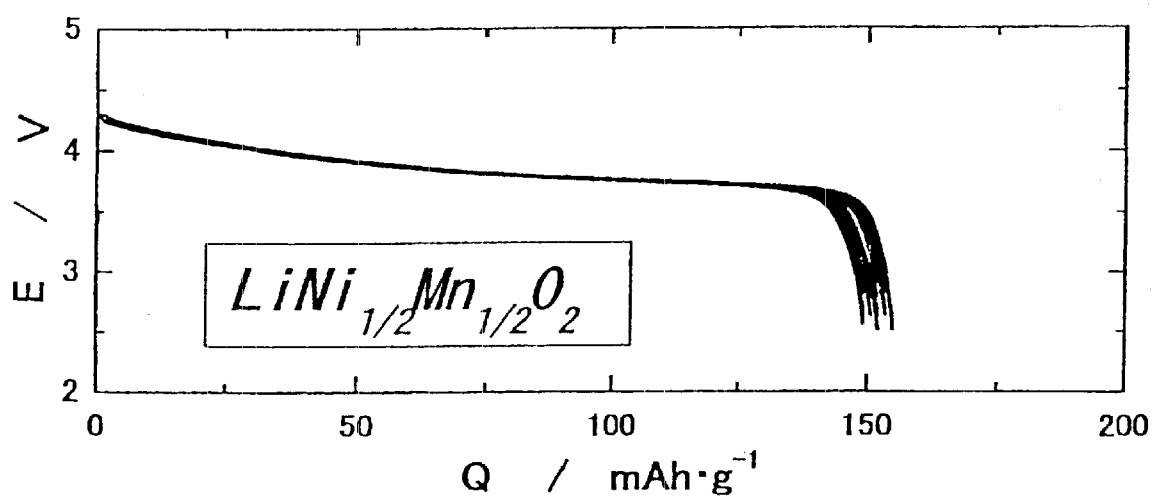
FIG. 17 is a diagram showing discharge curves for $LiNi_{1/2}Mn_{1/2}O_2$.

FIG. 17 is a diagram showing discharge curves up to 30 cycles, one overlaid on another, when $LiNi_{1/2}Mn_{1/2}O_2$ was used. In this case, the charge voltage was 4.3 V. As is apparent from the fig., the shape of the discharge curve stays essentially the same from cycle to cycle, and virtually no deterioration in capacity occurs.

As the nickel to manganese ratio deviates from 1:1, the properties of the higher content element begin to have a greater influence than those of the other element, but if the deviation is within about 10%, the novel feature of the nickel manganese mixture can be maintained. Accordingly, the material should be synthesized while maintaining the deviation within these tolerance limits.

The research of the present invention has been conducted focusing on $LiNi_{1-x}Mn_xO_2$, and it has been found that a novel function can be achieved by incorporating nickel and manganese in substantially the same atomic ratios to form a solid solution. It can be easily predicted that an added value will be provided by adding a new element to these materials.

There is exemplified a materials represented by the formula $LiNI_{1-x}Mn_xA_2O_2$. For example, it is expected that by adding a suitable amount of aluminum, magnesium, calcium, strontium or the like to A, the thermal stability of the resulting material improves. It is also expected that by adding another transition metal to A, improvements in cycle life and polarization can be achieved. Furthermore, it is expected that by combining these elements, the effect of each element can be improved simultaneously.

Next, a description will be given of other constituent materials that can be used when fabricating a lithium secondary battery that uses the positive electrode of the present invention.

The electrically conductive material used in the positive electrode mixture for the production of the positive electrode of the present invention is not limited to a particular material, but any electronically conductive material can be used as long as the material does not cause any chemical change in the fabricated battery. Examples include: graphites such as natural graphite (scale graphite and the like) and artificial graphite; carbon blacks such as acetylene black, Ketjen black, channel black, furnace black, lamp black and thermal black; electrically conductive fibers such as carbon fiber and metallic fiber; metallic powders such as carbon fluoride powder, copper powder, nickel powder, aluminum powder and silver powder; electrically conductive whiskers such as zinc oxide whisker and potassium titanate whisker; electrically conductive metal oxides such as titanium oxide; and electrically conductive organic materials such as polyphenylene derivatives. These materials can be used alone or in any combination thereof within the scope that does not impair the effect of the present invention.

Among them, artificial graphite, acetylene black and nickel powder are particularly preferable. The amount of the electrically conductive material to be added is not particularly specified, but 1 to 50% by weight is preferably, and 1 to 30% by weight is particularly preferable. In the case of carbon and graphite, 2 to 15% by weight is particularly preferable.

For the binder used in the positive electrode mixture of the present invention, a polymer having a decomposition temperature of 300° C. or higher is preferable. Examples include polyethylene, polypropylene, polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethyl vinyl ether-tetrafluoroethylene copolymer. These materials can be used alone or in any combination thereof within the scope that does not impair the effect of the present invention.

Among others, polyvinylidene fluoride (PVDF) and polytetrafluoroethylene (PTFE) are most preferable.

The material, which constitutes the current collector for the positive electrode is not limited to a particular material, but any electronically conductive material can be used as long as the material does not cause any chemical change in the fabricated battery. The current collector may comprise, for example, stainless steel, nickel, aluminum, titanium, various alloys or carbons, or a composite material such as aluminum or stainless steel with its surface treated with carbon, nickel, titanium or silver.

Among them, aluminum or an aluminum alloy is preferable. The surface of these materials may be treated with oxidization. Also, the surface of the collector may be roughened by surface treatment. As for the collector shape, any shape commonly employed in the field of batteries can be used. Examples of the shape include a foil, a film, a sheet and a net, a punched sheet, a lath body, a porous body, a foamed body, fibers and a non-woven fabric. The thickness is not particularly specified, but the thickness of 1 to 500 μm is preferable.

(2) Negative Electrode Active Material

The negative electrode material used in the present invention can comprise a compound, that can absorb and desorb a lithium ion, such as lithium, alloys such as lithium alloys, intermetallic compounds, carbon, organic compounds, inorganic compounds, metal complexes and organic polymer compounds. These materials can be used alone or in any combination thereof within the scope that does not impair the effect of the present invention.

As the lithium alloys, there are exemplified Li—Al based alloys (U.S. Pat. No. 4,002,492 and the like), Li—Al—Mn based alloys, Li—Al—Mg based alloys, Li—Al—Sn based alloys, Li—Al—In based alloys, Li—Al—Cd based alloys, Li—Al—Te based alloys, Li—Ga based alloys (Japanese Unexamined Patent Publication No. Sho 60-257072), Li—Cd based alloys, Li—In based alloys, Li—Pb based alloys, Li—Bi based alloys, Li—Mg based alloys and the like. In this case, the lithium content is preferably 10 or higher % by weight.

As the alloy and intermetallic compounds, there are compounds of a transition metal and silicon, compounds of a transition metal and tin and the like. A compound of nickel and silicon is preferable.

As the carbonaceous materials, there are coke, pyrolytic carbon, natural graphite, artificial graphite, mesocarbon microbeads, graphite mesophase particles, gas phase grown carbon, vitrified carbons, carbon fiber (polyacrylonitrile type, pitch type, cellulose type and gas phase grown carbon), amorphous carbon and carbons obtained by baking organic materials. These materials can be used alone or in any combination thereof within the scope that does not impair the effect of the present invention. Among them, graphite materials such as graphite mesophase particles, natural graphite, and artificial graphite are preferable.

The carbonaceous material may contain, in addition to carbon, such dissimilar compounds as O, B, P, N, S, SiC and $B_4C$. The content of such material is preferably 0 to 10% by weight.

As the inorganic compounds include, there are tin compounds and silicon compounds for example, and as the inorganic oxides, there are titanium oxide, tungsten oxide, molybdenum oxide, niobium oxide, vanadium oxide and iron oxide for example.

As the inorganic chalcogenides, there are, for example, iron sulfide, molybdenum sulfide and titanium sulfide.

As the organic polymer compounds, there are, for example, polymer compounds such as polythiophene and polyacetylene. And as the nitride, there are, for example, cobalt nitride, copper nitride, nickel nitride, iron nitride and manganese nitride.

These negative electrode materials may be used in combination; for example, a combination of carbon and an alloy and a combination of carbon and an inorganic compound are possible.

The average particle size of the carbon material used in the present invention is preferably 0.1 to 60 $\mu$m, and more preferably 0.5 to 30 $\mu$m. The specific surface is preferably 1 to 10 $m^2/g$. In terms of the crystal structure, graphite having a hexagonal lattice spacing ($d_{002}$) of carbon is 3.35 to 3.40 Å and a size (LC) of the crystalline in the c-axis direction of 100 Å or larger, is preferable.

In the present invention, since the positive electrode active material contains Li, a negative electrode material (carbon or the like) that does not contain Li can be used. However, it is preferable to add a small amount of Li (about 0.01 to 10 parts by weight per 100 parts by weight of the negative electrode material) into such a Li non-containing negative electrode material, because if part of Li becomes inactive by reacting with the electrolyte, for example, it can be supplemented with the Li added in the negative electrode material.

To add Li into the negative electrode material, Li is impregnated into the negative electrode material, for example, by applying a heated and melted lithium metal onto the current collector to which the negative electrode material is pressed and adhered, or by attaching a lithium metal in advance onto an electrode group by pressing and adhering or other means and doping Li into the negative electrode material electrochemically in the electrolyte solution.

The electrically conductive material used in the negative electrode mixture is not limited to a particular material but, as in the case of the electrically conductive material used in the positive electrode mixture, any electronically conductive material can be used as long as the material does not cause any chemical change in the fabricated battery. If the carbonaceous material is used for the negative electrode, the electrically conductive material need not necessarily be added because the carbonaceous material itself has electronical conductivity.

For the binder used in the negative electrode mixture, either a thermoplastic resin or a thermosetting resin can be used, but a polymer having a decomposition temperature of 300° C. or higher is preferable.

Examples for the binging agent include polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer and vinylidene fluoride-perfluoromethyl vinyl ether-tetrafluoroethylene copolymer. Among them, styrene-butadiene rubber and polyvinylidene fluoride are preferably, and styrene-butadiene rubber is the most preferable.

The material of the current collector for the negative electrode is not limited to a particular material, but any electronically conductive material can be used as long as the material does not cause any chemical change in the fabricated battery. As the material constituting the current collector, there are, for example, stainless steel, nickel, copper, titanium, carbon, a material such as copper or stainless steel with the surface treated with carbon, nickel, titanium or silver, or an Al—Cd alloy. Among them, copper or a copper alloy is preferable. The surface of these materials may be treated with oxidization. Also, the surface of the collector may be roughened to form convex and concave by surface treatment.

As for the collector shape, a foil, a film, a sheet, a net, a punched sheet, a lath body, a porous body, a foamed body, or fiber molding can be used, as in the case for the above positive electrode. The thickness is not particularly specified, but the thickness between 1 $\mu$m and 500 $\mu$m is preferable.

In addition to the electrically conductive material and the binder, a filler, a dispersing agent, an ion conducting material, a pressure reinforcing agent, and other various additives may be added in the electrode mixture. Any fibrous material can be used for the filler as long as it does not cause any chemical change in the fabricated battery. Usually, a fiber comprising an olefin polymer fiber such as polypropylene or polyethylene, a glass fiber or a carbon fiber is used. The amount of the filler to be added is not particularly specified, but 0 to 30% by weight is preferable.

The positive electrode and negative electrode used in the present invention may each have, in addition to the mixture layer containing the positive electrode or negative electrode active material, other layers such as a base coat layer intended, for example, to improve the adhesion between the collector and the mixture layer, the electrical conductivity, the cycle characteristics, and the charge/discharge efficiency, and a protective layer intended for mechanical and chemical protection of the mixture layer. The base coat layer and the protective layer may contain a binder or electrically conductive agent particles or electrically non-conductive particles.

(3) Separator An insulating microporous thin film having a large ion permeability and a specified mechanical strength may be used as the separator. Preferably, the film has the function of closing the pores and increasing the resistance at a temperature of 80° C. or higher. A sheet or non-woven fabric made of an olefin polymer such as polypropylene or polyethylene alone or in combination thereof, or made of glass fiber is used because of their resistances to an organic solvent and hydrophobicity.

It is desirable that the pore diameter of the separator be made small enough to prevent the active material, the binder, the conductive agent and the like separated from the electrode sheet from passing through the separator; for example, a diameter of 0.1 to 1 $\mu$m is desirable. As for the separator thickness, a thickness of 10 to 300 $\mu$m is usually preferable. Porosity is determined in accordance with the electron or ion permeability, the material used, the film thickness and the like, and generally a porosity of 30 to 80% is desirable. Further, when a flame retardant or nonflammable material such as glass or metal oxide film is used, the safety of the battery is further enhanced.

(4) Non-aqueous Electrolyte

The non-aqueous electrolyte used in the present invention comprises a solvent and a lithium salt dissolved in the solvent. Compositionally, the solvent contains an unsymmetrical acyclic carbonate (for example, methyl ethyl carbonate) or at least two acyclic esters having different residues (for example, dimethyl carbonate and diethyl carbonate, or dimethyl carbonate and ethyl propionate). Specific examples of these and other solvent compositions will be given below.

Esters, which may be used as the non-aqueous solvent include, for example, cyclic carbonates such as ethylene carbonate (EC), propylene carbonate (PC), butylene carbonate (BC) and vinylene carbonate (VC), acyclic carbonates such as dimethyl carbonate (DMC), diethyl carbonate (DEC), ethyl methyl carbonate (EMC), and dipropyl carbonate (DPC), aliphatic carboxylic acid esters (carboxylates) such as methyl formate (MF), methyl acetate (MA), methyl propionate (MP) and ethyl propionate (MA), and $\gamma$-lactones such as $\gamma$-butyrolactone (GBL).

For cyclic esters, EC, PC, GBL and the like are particularly preferable, and for acyclic esters, acyclic carbonates such as DMC, DEC and EMC are preferable. Further, aliphatic carboxylates may also be preferably used, if occasion demands.

Preferably, the aliphatic carboxylate is contained in an amount of 30% or less, and more preferably 20% or less, of the total weight of the solvent.

The solvent in the electrolyte solution of the present invention may contain, in addition to the above esters in an amount of 80% or more, acyclic ethers such as 1,2-dimethoxyethane (DME), 1,2-diethoxyethane (DEE) and ethoxymethoxyethane (EME), cyclic ethers such as tetrahydrofuran and 2-methyltetrahydrofuran and aprotic organic solvents such as dimethyl sulfoxide, 1,3-dioxolane, formamide, acetamide, dimethylformamide, dioxolane, acetonitrile, propylnitrile, nitromethane, ethoxymonogrime, triester phosfate, trimethoxymethane, dioxolane derivative, sulfolane, methyl sulfolane, 1,3-methyl-2-imidazolidinone, 3-methy-2-oxazolidinone, propylene carbonate derivative, tetrahydrofuran derivative, ethyl ether, 1,3-propanesultone, anisole, dimethyl sulfoxide and N-methylpyrolidone.

Lithium salts dissolved in these solvents include, for example, $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $Li(CF_3SO_2)_2$, $LiAsF_6$, $LiN(CF_3SO_2)_2$, $LiB_{10}Cl_{10}$ (Japanese Unexamined Patent Publication No. Sho 57-74974), lithium lower aliphatic carboxylate (Japanese Unexamined Patent Publication No. Sho 60-41773), $LiCl$, $LiBr$, $LiI$ (Japanese Unexamined Patent Publication No. Sho 60-247265), chloroborane lithium (Japanese Unexamined Patent Publication No. Sho 61-165957), lithium tetraphenyl borate(Japanese Unexamined Patent Publication No. Sho 61-214376), and imides such as $LiN(CF_3SO_2)(C_2F_5SO_2)$, $LiN(CF_3SO_2)_2$, $LiN(C_2F_5SO_2)_2$ and $LiN(CF_3SO_2)(C_4F_9SO_2)$. These salts can be used in the electrolyte alone or in any combination thereof within the scope that does not impair the effect of the present invention. Among them, it is particularly preferable to add $LiPF_6$.

For the non-aqueous electrolyte used in the present invention, an electrolyte containing at least ethylene carbonate and methyl carbonate, and containing $LiPF_6$ as a lithium salt, is particularly preferable. When GBL is used as the main solvent, it is preferable to add an additive such as VC in an amount of several %, and to use a salt mixture of $LiBF_4$ and $LiN(C_2F_5SO_2)_2$ as the lithium salt instead of $LiPF_6$.

The amount of the electrolyte used in the battery is not particularly specified, but a suitable amount should be used according to the amount of the positive electrode and negative electrode materials and the size of the battery. The amount of the lithium salt to be dissolved in the non-aqueous solvent is not particularly specified, but 0.2 to 2 mol/l is preferable, and 0.5 to 1.5 mol/l is more preferable.

Further, an organic additive, such as 2-methylfuran, thiophene (Japanese Unexamined Patent Publication No. Sho 61-161673), pyrrole (Japanese Unexamined Patent Publication No. Hei 3-59963), aniline (Japanese Unexamined Patent Publication No. Sho 60-79677), crown ether, pyridine, triethyl phosphate, triethanolamine, cyclic ether, ethylene diamine, n-grime, hexaphosforic triamide, nitrobenzene derivative, or nitrogen-containing aromatic heterocyclic compound (Japanese Unexamined Patent Publication No. Hei 9-204932), may be dissolved in the above electrolyte to improve the charge/discharge characteristics. In use, the electrolyte is impregnated or filled into the separator comprising, for example, a porous polymer, glass filter, or non-woven fabric.

To make the electrolyte nonflammable, a halogen-containing solvent such as carbon tetrachloride or chlorotrifluoroethylene may be contained in the electrolyte. Also, carbon dioxide gas may be added in the electrolyte to confer suitability for high temperature storage.

Instead of the liquid electrolyte, a solid electrolyte as described below can also be used. The solid electrolyte is classified to inorganic or organic solid electrolyte.

As the inorganic solid electrolyte, nitrides of Li, halides of Li, and oxysalt of Li are well known. Among them, $Li_4SiO_4$, $Li_4SiO_4$—$LiI$—$LiOH$, $xLi_3PO_4$-$(1-x)Li_4SiO_4$, $Li_2SiS_3$, $Li_3PO_4$—$Li_2S$—$SiS_2$ and phosphorus sulfide compounds are effectively used.

As the organic solid electrolyte, on the other hand, there are polymer materials such as polyethylene oxide, polypropylene oxide, polyphosphazone, polyaziridine, polyethylene sulfide, polyvinyl alcohol, polyvinylidene fluoride, polyhexafluoropropylene, and their derivatives, mixtures, and complexes, are effectively used.

It is also possible to use a gel electrolyte formed by impregnating the above non-aqueous liquid electrolyte into the organic solid electrolyte. For the organic solid electrolyte here, polymer matrix materials such as polyethylene oxide, polypropylene oxide, polyphosphazone, polyaziridine, polyethylene sulfide, polyvinyl alcohol, polyvinylidene fluoride, polyhexafluoropropylene, and their derivatives, mixtures, and complexes, are effectively used. In particular, a copolymer of vinylidene fluoride and hexafluoropropylene and a mixture of polyvinylidene fluoride and polyethylene oxide are preferable.

As for the shape of the battery, any type such as coin type, button type, sheet type, cylindrical type, flat type and rectangular type can be used. In the case of a coin or button battery, the positive electrode active material mixture and negative electrode active material mixture are compressed into the shape of a pellet for use. The thickness and diameter of the pellet should be determined according to the size of the battery.

In the case of a sheet, cylindrical or rectangular type battery, the positive electrode active material mixture and negative electrode active material mixture are usually applied (for coating) onto the current collector, and dried and compressed for use. A well known applying method can be used such as a reverse roll method, direct roll method, blade method, knife method, extrusion method, curtain method, gravure method, bar method, casting method, dip method, and squeeze method. Among them, the blade method, knife method, and extrusion method are preferable.

The application is conducted preferably at a rate of 0.1 to 100 m/min. By selecting the appropriate applying method according to the solution properties and drying characteristics of the mixture, a applied layer with good surface condition can be obtained. The application can be conducted on one side as desired, or on both sides at the same time. Preferably, the applied layer is formed on each side of the current collector, and the applied layer on one side may be constructed from a plurality of layers including a mixture layer. The mixture layer contains a binder and an electrically conductive material, in addition to the material responsible for the intercalation and releasing of a lithium ion, like the positive electrode and negative electrode active materials. In addition to the mixture layer, a layer containing no active material such as a protective layer, a under coating layer formed on the current collector, and an intermediate layer formed between the mixture layers may be provided. It is preferable that these active-material non-containing layers contain an electrically conductive particle, an insulating particle and a binder.

The application may be performed continuously or intermittently or in such a manner as to form stripes. The thickness, length, and width of the applied layer is determined according to the size of the battery, but preferably, the thickness of the applied layer on each side, after being dried and compressed, is 1 to 2000 $\mu$m.

For drying or dehydration method of the pellet and sheet, a commonly employed method can be used. Preferably, heated air, vacuum, infrared radiation, far infrared radiation, electron beam radiation and low humidity air are used alone or in any combination thereof.

The temperature used is preferably within the range of 80 to 350° C., and more preferably 100 to 250° C. The water content of the battery as a whole is preferably held to 2000 ppm or less, and for the positive electrode mixture, negative electrode mixture and electrolyte, it is preferable to hold the water content to 500 ppm or less in view of the cycle characteristics.

For the sheet pressing method, a commonly employed method can be used, but a mold pressing method and calender pressing method are particularly preferable. The pressure for use is not particularly specified, but 0.2 to 3 $t/cm^2$ is preferable. In the case of the calender pressing method, a press speed is preferably 0.1 to 50 m/min.

The pressing temperature is preferably between room temperature and 200° C. The ratio of the width of the positive electrode sheet to the width of the negative electrode sheet is preferably at 0.9 to 1.1, and more preferably at 0.95 to 1.0. The ratio of the content of the positive electrode material to the content of the negative electrode material differs according to the kind of the compound used and the formulation of the mixture, but can be set to an optimum value considering the capacity, cycle characteristics and safety.

The wound electrode structure in the present invention need not necessarily be formed in a true cylindrical shape, but may be formed in the shape of an elliptic cylinder whose cross section is an ellipse, the shape of a rectangular column having a rectangular face, or the prismatic shape, for example.

The present invention will now be described with reference to representative examples, but it will be recognized that the invention is not limited to the particular examples given hereinafter.

EXAMPLE 1

Comparative Example 1

Figure 18:
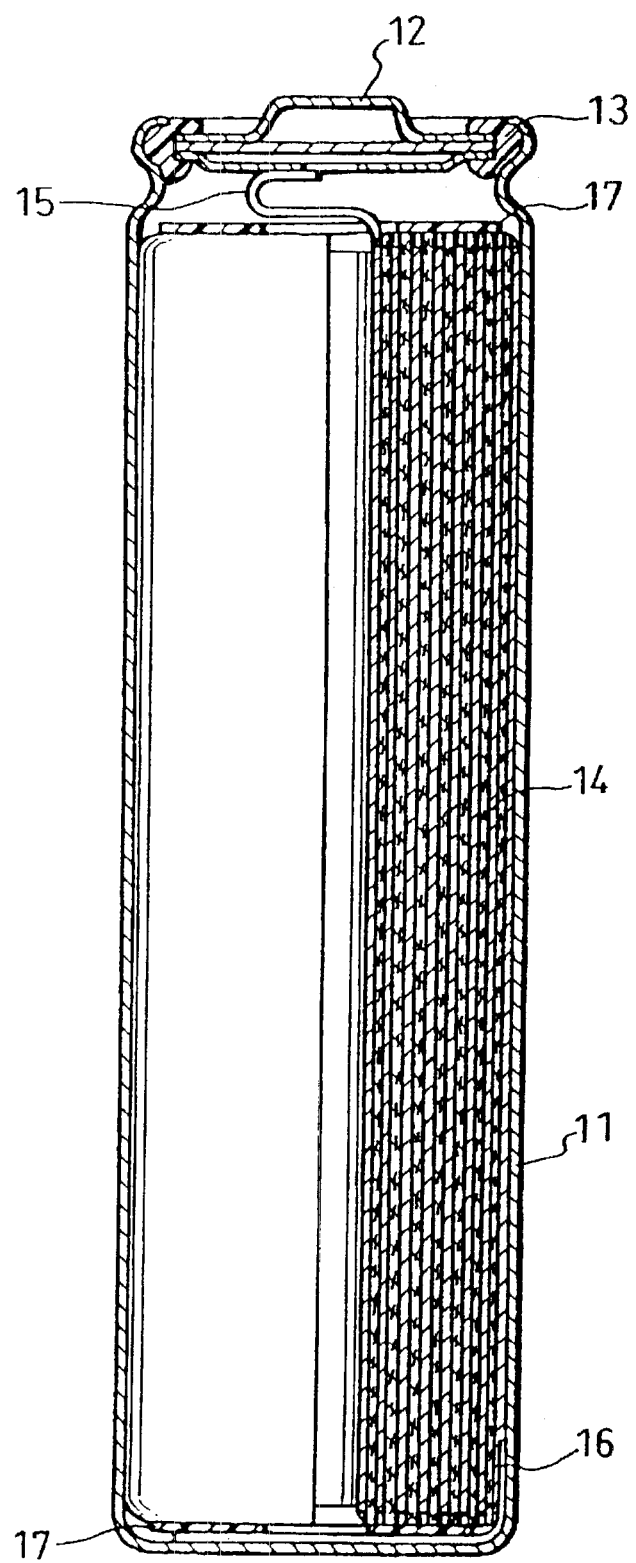
FIG. 18 is a vertical cross sectional view showing the cylindrical battery fabricated in one example of the present invention.

FIG. 18 is a vertical cross sectional view showing in simplified form the cylindrical battery fabricated in this example.

An electrode plate group 14, formed by spirally winding a positive electrode plate and a negative electrode plate a plurality of times with a separator interposed therebetween, is contained in a battery case 11. A positive electrode lead 15 is brought out of the positive electrode plate and connected to a sealing plate 12, and a negative electrode lead 16 is brought out of the negative electrode plate and connected to the bottom of the battery case 11. A metal or alloy having electronic conductivity and resistance to organic electrolyte can be used for the battery case and the lead plates. Examples include such metals as iron, nickel, titanium, chromium, molybdenum, copper, aluminum or their alloys. Among them, a stainless steel plate or an Al—Mn alloy plate is preferable for the battery case, while aluminum and nickel are most preferable for the positive electrode lead and the negative electrode lead, respectively. Alternatively, various kinds of engineering plastics and metals combined with such plastics may be used for the construction of the battery case to reduce the battery weight.

The top and bottom of the electrode plate group 14 are each provided with an insulating ring 17. In this condition, an electrolyte is charged, and the battery case is hermetically sealed with the sealing plate. At this time, a safety valve may be attached to the sealing plate. Instead of the safety valve, various other safety devices known in the art may also be used. For example, a fuse, a bimetal, a PTC device or the like can be used as an overcurrent protection device. Rather than attaching a safety valve, other methods such as cutting a nick into the battery case, cracking the gasket or the sealing plate, or cutting off the lead plate, may be employed for protecting internal pressure rise of the battery case. Also, a protection circuit having an overcharge or overdischarge inhibiting function may be incorporated into charger, or such a circuit may be connected separately.

Alternatively, a method that cuts off the current when the battery internal pressure rises can be employed as an overcharge protection measure. In this case, a compound that raises the internal pressure can be added into the active material mixture or in the electrolyte. Such compounds include carbonates such as $Li_2CO_3$, $LiHCO_3$, $Na_2CO_3$, $NaHCO_3$, $CaCO_3$ and $MgCO_3$, for example. Known methods (e.g., DC or AC electric welding, laser welding, ultrasonic welding or the like) can be used for welding the cap, battery case, sheets, and lead plates. For the sealing agent used for sealing, a prior known compound or mixture such as asphalt can be used.

A positive electrode plate was produced as follows. 10 Parts by weight of carbon powder as the electrically conductive material and 5 parts by weight of polyvinylidene fluoride resin as the binder were mixed together with 85 parts by weight of the powder of the positive electrode active material of the present invention. The resulting mixture was then dispersed into dehydrated N-methylpyrrolidinone to obtain a slurry, and the slurry was applied on the positive electrode current collector formed from an aluminum foil and, after drying and roll-pressing, the foil was cut to the specified size to obtain the positive electrode plate.

A negative electrode plate was composed mainly of a carbonaceous material; this material and a styrene-butadiene rubber type binder were mixed in a weight ratio of 100:5, and the resulting mixture was applied on both surfaces of a copper foil and, after drying and roll-pressing, the foil was cut to the specified size to obtain the negative electrode plate.

A microporous polyethylene film was used as the separator. An organic electrolyte was prepared by dissolving 1.5 mol/l of $LiPF_6$ into a solvent mixture of polyethylene carbonate and ethyl methyl carbonate in a volumetric ratio of 1:1. The fabricated cylindrical battery was 18 mm in diameter and 650 mm in height.

For comparison purposes, another cylindrical battery was fabricated using the same manner except that $LiCO_2CO$ was employed as the positive electrode active material. Electrical characteristics measured on these two batteries are compared in Table 2.

These batteries were first charged to 4.2 V with a constant current of 100 mA, and then discharged with a constant current of 100 mA until the voltage dropped to 2.0 V. This charge/discharge cycle was repeated several times, and when the battery capacity settled to a substantially consistent value, the capacity was confirmed.

The capacity was confirmed using the following conditions. The charging was conducted at a constant voltage of 4.2 V, and the maximum current was set to 1 A. The charging was stopped when the current value reached 50 mA. The discharging was conducted with a constant current of 300 mA until the voltage dropped to 2.5 V. The discharge capacity obtained at this time was measured as the discharge capacity of the battery. The charging and discharging were conducted at an ambient temperature of 25° C. Denoting the battery capacity as 1C, the discharge capacity was measured when the battery was discharged with a current (0.2C) at a rate whereby the battery was fully discharged in 5 hours and with a current (2C) at a rate whereby the battery was fully discharged in 0.5 hour, respectively, and the capacity ratio of 0.2C/2C was taken as the high rate discharging ratio. The low temperature discharging ratio is the discharge capacity ratio (−10° C./20° C.) measured when the battery was discharged with 1C current at 20° C. and at −10° C., respectively. The cycle life is expressed by the percentage of the capacity at the end of 100 cycles to the initial capacity.

TABLE 2

| | | Capacity (mAh) | High rate discharging ratio (%) | Low temperature discharging ratio (%) | Cycle life |
|---|---|---|---|---|---|
| Ex.1 | $LiNi_{1-x}Mn_xO_2$ | 1580 | 95 | 70 | 90 |
| Com. Ex.1 | $LiCoO_2$ | 1500 | 92 | 50 | 85 |

As shown in Table 2, the battery of the present invention exhibited better results in all the items tested. Accordingly, when the material of the present invention is used as the positive electrode active material for a lithium secondary battery, it becomes possible to provide a battery having better characteristics than conventional batteries using the previously predominant material, $LiCoO_2$.

EXAMPLE 2

Comparative Example 2

The positive electrode material of the present invention has the effect of suppressing the expansion of the battery, as earlier described. To verify this, a thin battery was fabricated, and the variation of battery thickness associated with charging and discharging operations, the rate of expansion of battery thickness over charge/discharge cycle and the like were measured.

The positive electrode plate and the negative electrode plate were produced in the same manner as in Example 1, except that a copolymer of vinylidene fluoride (PVDF) and propylene hexafluoride (HFP), capable of causing the liquid electrolyte to gel, was used as a binder in addition to the usual binder agent. PVDF and HFP capable of causing the liquid electrolyte to gel were also applied to coat the polyethylene microporous film of the separator.

The thus produced positive electrode and negative electrode plates were wound with the separator interposed therebetween, and the wound structure was molded into a flat shape to produce an electrode group for use in a rectangular-shaped battery. Here, if pressure is applied to the electrode group after heating, the electrode group and the separator will be bonded together via the PVDF and HFP polymers; therefore, such a heating and pressing step may be added. Then, the electrode group was inserted in a laminate bag. This bag was made by laminating a resin film and an aluminum foil so that when heat and pressure were applied, the resin would melt to provide adhesion.

After that, the electrolyte was charged and, after impregnating the electrolyte in vacuo, the battery was sealed by thermally fusing the laminate bag still in vacuo.

The same electrolyte solution as used in Example 1 was used here. By heating after sealing, the electrolyte was caused to swell in the polymer and gelled. The heat treatment for the gelation was conducted at 80 to 90° C. for 1 to 3 hours. Here, if excessive gas generation is expected to occur during the initial charging, a step for removing a gas should be added. In that case, the aluminum laminate bag is made slightly larger, the bottom of the gag is opened to exhaust the gas generated during the initial charging, and then the bag is sealed again.

The electrochemical characteristics of the thus fabricated battery were evaluated in the same manner as in Example 1. To evaluate the capacity, the battery was first charged to 4.2 V with a constant current of 50 mA, and then discharged with a constant current of 50 mA until the voltage dropped to 2.0 V.

This charge/discharge cycle was repeated several times, and when the battery capacity settled to a substantially consistent value, the capacity was confirmed. The capacity was confirmed using the following conditions.

The charging was conducted at a constant voltage of 4.2 V, and the maximum current was set to 500 mA. The charging was stopped when the current value reached 20 mA. The discharging was conducted with a constant current of 100 mA until the voltage dropped to 2.5 V. The discharge capacity obtained at this time was measured as the discharge capacity of the battery. The charging and discharging were conducted at an ambient temperature of 25° C. To evaluate the change of the battery thickness, the thickness was measured at the center of the battery using calipers, and the difference between the thickness in the charged state and the thickness in the discharged state was obtained. Likewise, to evaluate the change of the battery thickness over charge/discharge cycle, the thickness when the battery was charged after 100 cycles was compared with the thickness when the battery was initially charged, and the difference between them was obtained. For comparison purposes, a thin battery fabricated using $LiCoO_2$ as the positive electrode active material was measured in the same manner. The results of the experiment are shown in Table 3.

TABLE 3

|  |  | Capacity (mAh) | Change of thickness associated with charge and discharge(mm) | Change of thickness after cycles (mm) |
|---|---|---|---|---|
| Ex.2 | $LiNi_{1-x}Mn_xO_2$ | 850 | 0.04 | 0.08 |
| Com.Ex.2 | $LiCoO_2$ | 820 | 0.15 | 0.4 |

As is apparent from Table 3, when the positive electrode material of the present invention is used, the change of the battery thickness can be suppressed.

EXAMPLE 3

Comparative Example 3

The electronic conductivity of $LiNiO_2$ and $LiMnO_2$ is not good enough. As a result, large polarization occurs at the end of discharging, and the capacity decreases particularly during high rate discharging. The nickel and manganese elements have different electronic structures. However, when these elements are incorporated together to form a solid solution at the atomic level, interactions occur between the electronic structure of closely located dissimilar element.

In the combination of nickel and manganese, this phenomenon acts to improve the electron conductivity of the material, so that electron conductivity comparable to that of a metal can be given. Presumably, this can be proved by computational chemistry such as the DV-xα method.

As is apparent from the above, it is important that the solid solution be formed at the atomic level, and that adjacent atoms are dissimilar. In other words, when the elements to form the solid solution are incorporated in a ratio of 1:1, the probability of adjacent elements being dissimilar is the highest. The point of incorporating nickel and manganese in 1:1 lies here. In this example, to confirm the polarization phenomenon within the range of x from 0.3 to 0.7, the same test as carried out to measure the high rate discharging ratio shown in Table 4 was conducted on the batteries shown in FIG. 18.

TABLE 4

| x | High rate discharging ratio % (2C/0.2C, 20° C.) |
|---|---|
| 0.3 | 71 |
| 0.4 | 92 |
| 0.5 | 95 |
| 0.6 | 91 |
| 0.7 | 65 |

From Table 4, it can be seen that the high rate discharging ratio drops as the value of x deviates from 0.5. The maximum allowable deviation is about 10%, and when exceeding 10%, the high rate discharging ratio drops sharply.

Furthermore, by incorporating nickel and manganese, the discharge voltage increases by about 100 mV. The discharge voltage is 4V in the case of $LiNiO_2$ and 3V in the case of $LiMnO_2$. If predicted from this, the discharge voltage is supposed to be 3.5 V in the case of nickel manganese since nickel and manganese are mixed in 1:1. In reality, however, in the case of the solid solution of 1:1, the discharge voltage is about 100 mV higher than that in the case of $LiNiO_2$. Presumably, this also proves that the nickel and manganese atoms are closely interacting with each other. It was also found that the voltage was the highest when x=0.5, and dropped as x deviates from this value.

EXAMPLE 4

Stability of the Material

When Li is desorbed by charging, $LiNiO_2$ becomes very unstable and releases oxygen and is reduced to NiO at a relatively low temperature. This is a fatal disadvantage if this material is used as the positive electrode active material of a battery. Generated oxygen can lead to thermal runaway of the battery, causing a fire or even an explosion.

This problem can be alleviated by incorporating manganese in a ratio of 1:1. The battery used in Example 3 was charged. After that, the battery was disassembled and the positive electrode mixture was taken out. This material was subjected directly to DSC (differential scanning calorimetry) measurement. The exothermic heat peak observed at the lowest temperature at this time is shown in Table 5.

TABLE 5

| x | 1st peak temperature of DSC measurement (° C.) |
|---|---|
| 0.3 | 180 |
| 0.4 | 220 |
| 0.5 | 228 |
| 0.6 | 222 |
| 0.7 | 190 |

From Table 5, it can be seen that the temperature is highest when x=0.5. This means that the material is thermally most stable when x=0.5. The maximum allowable deviation from x=0.5 is 10%, and when exceeding 10%, the thermal stability rapidly degrades, as shown.

In the above-described examples, a carbonaceous material was used as the negative electrode active material to evaluate the performance of the positive electrode; however, the negative electrode active material is not limited to this particular material, and an alloy, lithium metal, or a relatively low voltage oxide or nitride can also be used. Further, the electrolyte used in the examples was prepared by dissolving 1.5 mol/l of $LiPF_6$ into a solvent of polyethylene carbonate and ethyl methyl in a volumetric ratio of 1:1; however, the composition is not limited to this particular example, but an organic or inorganic solid electrolyte and the like can also be used.

According to the present invention, a non-aqueous electrolyte battery can be provided that can effectively utilize an inexpensive nickel manganese composite oxide as the positive electrode active material, and that achieves a high capacity and excellent charge/discharge efficiency.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A positive electrode active material for a non-aqueous electrolyte battery, comprising a crystalline particle of an oxide, said oxide containing nickel element and manganese element in substantially the same atomic ratios and having a rhombohedral crystal structure, wherein a c-axis attributed to a hexagonal system in the crystal structure of said crystalline particle is not shorter than 14.25 angstroms.

2. The positive electrode active material for a non-aqueous electrolyte battery in accordance with claim 1, wherein said oxide contains a lithium element.

3. The positive electrode active material for a non-aqueous electrolyte battery in accordance with claim 1, wherein said crystalline particle is in the shape of sphere.

4. The positive electrode active material for a non-aqueous electrolyte battery in accordance with claim 1, comprising a mixture of a crystalline particle of said oxide having a particle size of 0.1 to 2 μm, and a secondary particle of said crystalline particle having a particle size of 2 to 20 μm.

5. The positive electrode active material for a non-aqueous electrolyte battery in accordance with claim 1, wherein a volume of a unit lattice in said crystalline particle decreases through oxidation.

6. The positive electrode active material for a non-aqueous electrolyte battery in accordance with claim 1, wherein an error range between an atomic ratio of nickel element and an atomic ratio of manganese element is within not larger than 10 atomic %.

7. The positive electrode active material for a non-aqueous electrolyte battery in accordance with claim 2, wherein said lithium element, said nickel element and said manganese element contained in said oxide satisfy the relation: $0.97 \leq Li/(Ni+Mn) \leq 1.03$.

8. A method for producing a positive electrode active material for a non-aqueous electrolyte battery comprising the steps of:

introducing an alkaline solution and an aqueous solution containing a nickel salt and a manganese salt simultaneously into a reactor, and coprecipitating said nickel and said manganese while passing an inert gas therethrough to obtain a nickel manganese hydroxide and/or a nickel manganese oxide;

mixing said nickel manganese hydroxide and/or said nickel manganese oxide with a lithium compound to obtain a mixture; and baking said mixture at a temperature not lower than 950° C. to obtain a positive electrode material.

9. The method for producing a positive electrode active material for a non-aqueous electrolyte battery in accordance with claim 8, wherein the temperature of said reactor is 30 to 50° C.

10. The method for producing a positive electrode active material for a non-aqueous electrolyte battery in accordance with claim 8, wherein each of said nickel salt and said manganese salt is sulfate.

11. The method for producing a positive electrode active material for a non-aqueous electrolyte battery in accordance with claim 8, wherein said alkaline solution is a mixture of sodium hydroxide and ammonia water.

12. The method for producing a positive electrode active material for a non-aqueous electrolyte battery in accordance with claim 8, wherein said lithium compound is lithium carbonate and/or lithium hydroxide.

13. The method for producing a positive electrode active material for a non-aqueous electrolyte battery in accordance with claim 8, wherein said mixture after said baking is subsequently baked again at a temperature of 700 to 780° C.

14. A method for producing a positive electrode active material for a non-aqueous electrolyte battery, comprising the steps of:

dry mixing $LiOH.H_2O$, $Ni(OH)_2$ and MnOOH, each having a particle size of not larger than 0.3 μm to obtain a mixture; and baking said mixture at a temperature of not lower than 950° C. to obtain a positive electrode active material.

15. A non-aqueous electrolyte secondary battery comprising: a negative electrode containing, as a negative electrode active material, metallic lithium and/or a substance at least capable of absorbing and desorbing lithium ion; a separator; a positive electrode containing a positive electrode active material in accordance with claim 1; and an electrolyte.

16. The positive electrode active material in accordance with claim 1, wherein the oxide further contains a transition metal.

17. The positive electrode active material in accordance with claim 1, wherein the oxide further contains at least one element selected from aluminum, magnesium, calcium and strontium.

* * * * *